(12) United States Patent
Tanaka

(10) Patent No.: US 9,715,086 B2
(45) Date of Patent: Jul. 25, 2017

(54) IMAGING LENS AND IMAGING APPARATUS EQUIPPED WITH THE IMAGING LENS

(71) Applicant: FUJIFILM Corporation, Tokyo (JP)

(72) Inventor: Takuya Tanaka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/965,879

(22) Filed: Dec. 10, 2015

(65) Prior Publication Data

US 2016/0170182 A1 Jun. 16, 2016

(30) Foreign Application Priority Data

Dec. 16, 2014 (JP) .................. 2014-253740

(51) Int. Cl.
*G02B 13/00* (2006.01)
(52) U.S. Cl.
CPC ............... *G02B 13/0045* (2013.01)
(58) Field of Classification Search
CPC .. G02B 13/00; G02B 13/001; G02B 13/0015; G02B 13/002; G02B 13/0045; G02B 13/005; G02B 13/009

USPC ........ 359/641–643, 656–658, 749–752, 754, 359/757, 796, 797

See application file for complete search history.

(56) References Cited

U.S. PATENT DOCUMENTS

| | | | |
|---|---|---|---|
| 8,854,745 B1 | 10/2014 | Chen | |
| 2012/0188654 A1 | 7/2012 | Huang | |
| 2012/0243108 A1* | 9/2012 | Tsai ....................... | G02B 13/18 359/713 |
| 2015/0109685 A1 | 4/2015 | Shinohara et al. | |

FOREIGN PATENT DOCUMENTS

WO 2014/006822 1/2014

* cited by examiner

*Primary Examiner* — Scott J Sugarman
*Assistant Examiner* — Robert E Tallman
(74) *Attorney, Agent, or Firm* — Jianq Chyun IP Office

(57) ABSTRACT

An imaging lens, consisting essentially of six lenses, composed of in order from the object side, a first lens having a positive refractive power with a convex surface on the object side, a second lens having a negative refractive power, a third lens having a convex surface on the object side, a fourth lens having a positive refractive power, a fifth lens having a negative refractive power, and a sixth lens having a negative refractive power, in which predetermined conditional expressions are satisfied.

16 Claims, 18 Drawing Sheets

EXAMPLE 1

FIG.1  EXAMPLE 1

FIG.2 EXAMPLE 2

FIG.3  EXAMPLE 3

FIG.4  EXAMPLE 4

FIG.5  EXAMPLE 5

FIG.6 EXAMPLE 6

FIG.9  EXAMPLE 1

IMAGING LENS AND IMAGING APPARATUS EQUIPPED WITH THE IMAGING LENS

CROSS-REFERENCE TO RELATED APPLICATIONS

The present application claims priority under 35 U.S.C. §119 to Japanese Patent Application No. 2014-253740 filed on Dec. 16, 2014. The above application is hereby expressly incorporated by reference, in its entirety, into the present application.

BACKGROUND

The present disclosure relates to a fixed-focus imaging lens that forms an optical image of a subject on an image sensor such as, for example, a charge coupled device (CCD) or a complementary metal oxide semiconductor (CMOS), and an imaging apparatus equipped with the imaging lens to perform imaging, such as a digital still camera, a surveillance camera, a camera equipped cell phone, a personal digital assistance (PDA), a smartphone, a tablet terminal, a portable game machine, or the like.

Along with a widespread use of personal computers in homes, digital still cameras capable of inputting image information, such as captured landscapes and portraits, to personal computers are spreading rapidly. In addition, more and more cell phones, smartphones, and tablet terminals are equipped with camera modules for inputting images. Such devices having imaging capabilities use image sensors, such as CCDs, CMOSs, and the like. Recently, as downsizing of these image sensors have advanced, imaging devices as a whole and imaging lenses to be equipped therein are also demanded to be downsized. At the same time, higher pixelation of image sensors is also in progress, and high resolution and high performance are demanded for imaging lenses. For example, performance compatible with 5 mega pixels or greater, more preferably, 8 mega pixels or greater is demanded.

For such demands, imaging lenses composed of a relatively large number of lenses, i.e., five lenses or more are proposed. For example, U.S. Patent Application Publication No. 20120188654, U.S. Pat. No. 8,854,745, and International Patent Publication No. 2014/006822 propose imaging lenses that employ more lenses, i.e., six lenses, for further improvement of the performance.

SUMMARY

In the meantime, for imaging devices equipped with an imaging lens with a relatively short overall lens length used, in particular, in portable terminals, smartphones, or tablet terminals, the opportunity for performing multipurpose photography is increasing, and a demand for mounting a telephoto type imaging lens having a somewhat longer focal length is gradually increasing. Generally, the telephoto type imaging lens, however, tends to become larger as the focal length is increased. Hence, an imaging lens, despite a telephoto type imaging lens, that satisfies a demand for reducing the overall lens length (reducing the overall lens length with respect to the focal length of the entire system) is sought. In order to respond to such demands, the imaging lenses described in U.S. Patent Application Publication No. 20120188654, U.S. Pat. No. 8,854,745, and International Patent Publication No. 2014/006822 are preferably further reduced in overall lens length.

The present disclosure has been developed in view of the circumstances described above, and the present disclosure provides a telephoto type imaging lens which is reduced in overall lens length and capable of realizing high imaging performance from the central angle of view to the peripheral angle of view, and an imaging apparatus equipped with the imaging lens and capable of capturing a high resolution image.

An imaging lens of the present disclosure consists of six lenses, composed of, in order from the object side, a first lens having a positive refractive power with a convex surface on the object side, a second lens having a negative refractive power, a third lens with a convex surface of the object side, a fourth lens having a positive refractive power, a fifth lens having a negative refractive power, and a sixth lens having a negative refractive power, in which the following conditional expressions are satisfied:

$$1.55 < f/f1 < 2.5 \tag{1}$$

$$-1.65 < f/f2 < -0.8 \tag{2}$$

$$0.5 < f/f4 < 1.7 \tag{3}$$

where:
 f is the focal length of the entire system;
 f1 is the focal length of the first lens;
 f2 is the focal length of the second lens and
 f4 is the focal length of the fourth lens.

In the imaging lens of the present disclosure, the term "consists of six lenses" refers to include the case in which the imaging lens of the present disclosure includes a lens having substantially no refractive power, an optical element other than a lens, such as a stop, a cover glass, and the like, a lens flange, a lens barrel, an image sensor, and a mechanical component, for example, a camera shake correction mechanism, other than the six lenses. The surface shapes and the signs of refractive powers of the foregoing lenses are considered in the paraxial region if an aspherical surface is involved. Employment of the following preferable configurations in the imaging lens of the present disclosure may further improve the optical performance.

In the imaging lens of the present disclosure, the second lens preferably as a meniscus shape with a convex surface on the object side.

In the imaging lens of the present disclosure, the third lens preferably has a meniscus shape with a convex surface on the object side.

In the imaging lens of the present disclosure, the fourth lens preferably has a meniscus shape with a concave surface on the object side.

In the imaging lens of the present disclosure, the fifth lens preferably has a concave surface on the object side.

Preferably, the imaging lens of the present disclosure further includes an aperture stop located on the object side of the object side surface of the second lens.

The imaging lens of the present disclosure may satisfy any one or any combination of the following conditional expressions (4) to (5), (1-1) to (5-1), (1-2) to (4-2).

$$1.6 < f/f1 < 2.2 \tag{1-1}$$

$$1.65 < f/f1 < 2 \tag{1-2}$$

$$-1.6 < f/f2 < 0.9 \tag{2-1}$$

$$-1.5 < f/f2 < 1 \tag{2-2}$$

$$0.7 < f/f4 < 1.6 \tag{3-1}$$

$$0.8 < f/f4 < 1.5 \quad (3\text{-}2)$$

$$-1.5 < f/f6 < -0.3 \quad (4)$$

$$-1.3 < f/f6 < -0.4 \quad (4\text{-}1)$$

$$-1.2 < f/f6 < 0.5 \quad (4\text{-}2)$$

$$-5 < (L4r+L4f)/(L4r-L4f) < -1.5 \quad (5)$$

$$-3.5 < (L4r+L4f)/(L4r-L4f) < -1.6 \quad (5\text{-}1)$$

where:
  f is the focal length of the entire system;
  f1 is the focal length of the first lens;
  f2 is the focal length of the second lens
  f4 is the focal length of the fourth lens;
  f6 is the focal length of the sixth lens;
  L4r is the paraxial radius of curvature of the image side surface of the fourth lens; and
  L4f is the paraxial radius of curvature of the object side surface of the fourth lens.

An imaging apparatus according to the present disclosure is equipped with the imaging lens of the present disclosure.

According to the imaging lens of the present disclosure, the configuration of each lens element is optimized in a lens configuration of six elements in total. This allows realization of a lens system, despite a telephoto type imaging lens, which is reduced in overall lens length and has high imaging performance from the central angle of view to the peripheral angle of view.

According to the imaging apparatus of the present disclosure, a high resolution image may be captured because the apparatus is configured to output an imaging signal according to an optical image formed by any of the high performance imaging lenses of the present disclosure.

DETAILED DESCRIPTION OF THE PREFERRED EMBODIMENTS

Hereinafter, embodiments of the present disclosure will be described in detail with reference to the accompanying drawings.

Figure 1:
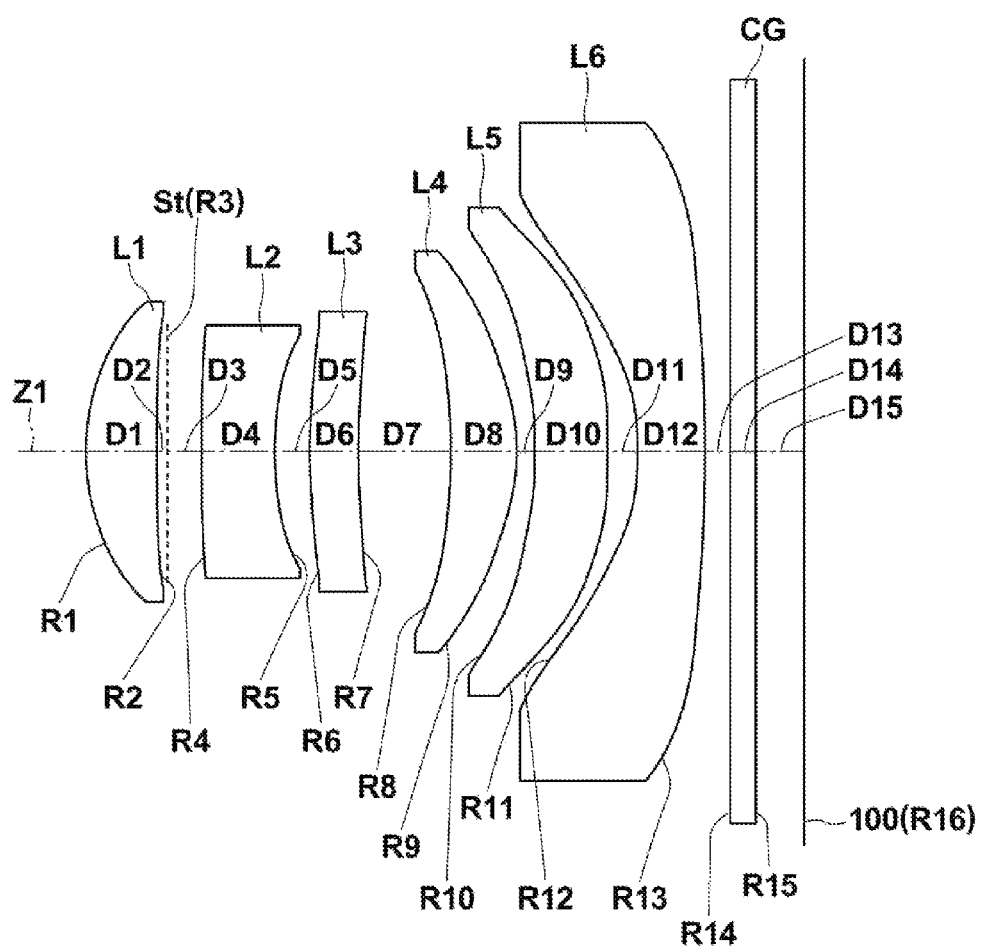
FIG. 1 is a cross-sectional view of an imaging lens according to one embodiment of the present disclosure, illustrating a first configuration example, which corresponds to Example 1.
Figure 2:
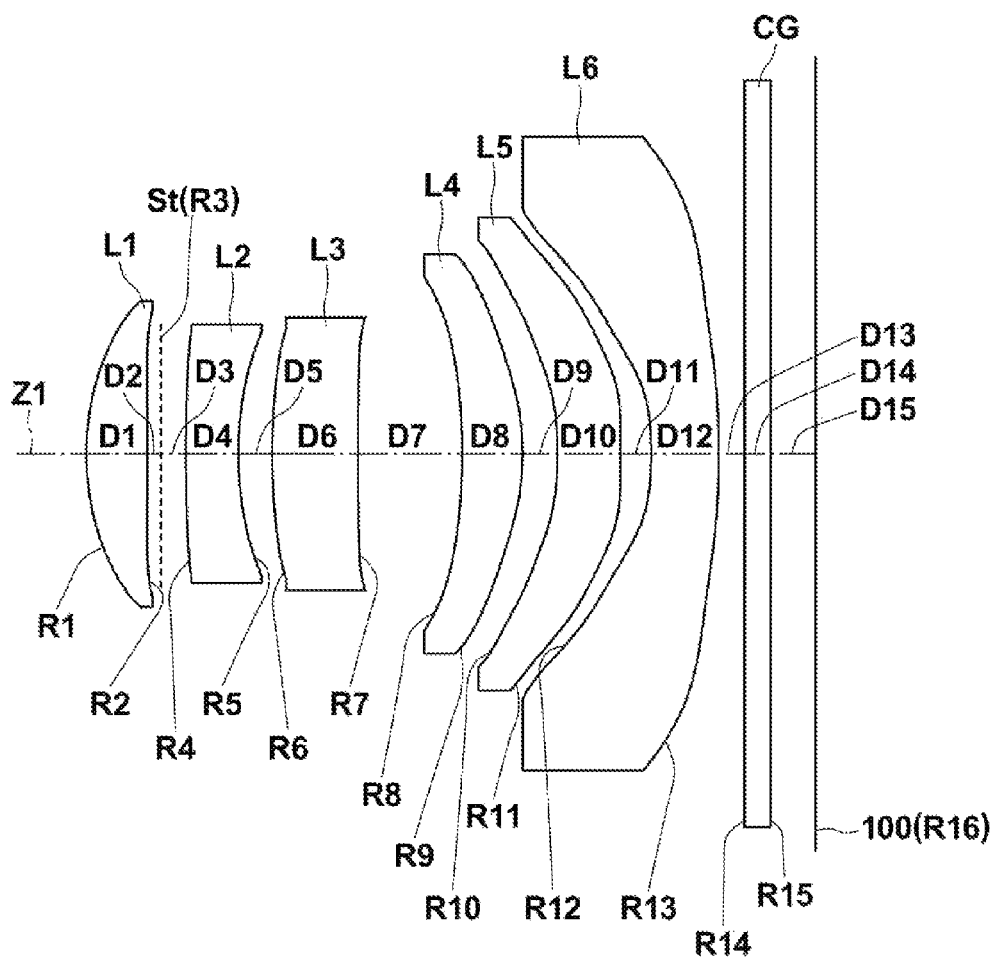
FIG. 2 is a cross-sectional view of an imaging lens according to one embodiment of the present disclosure, illustrating a second configuration example, which corresponds to Example 2.
Figure 3:
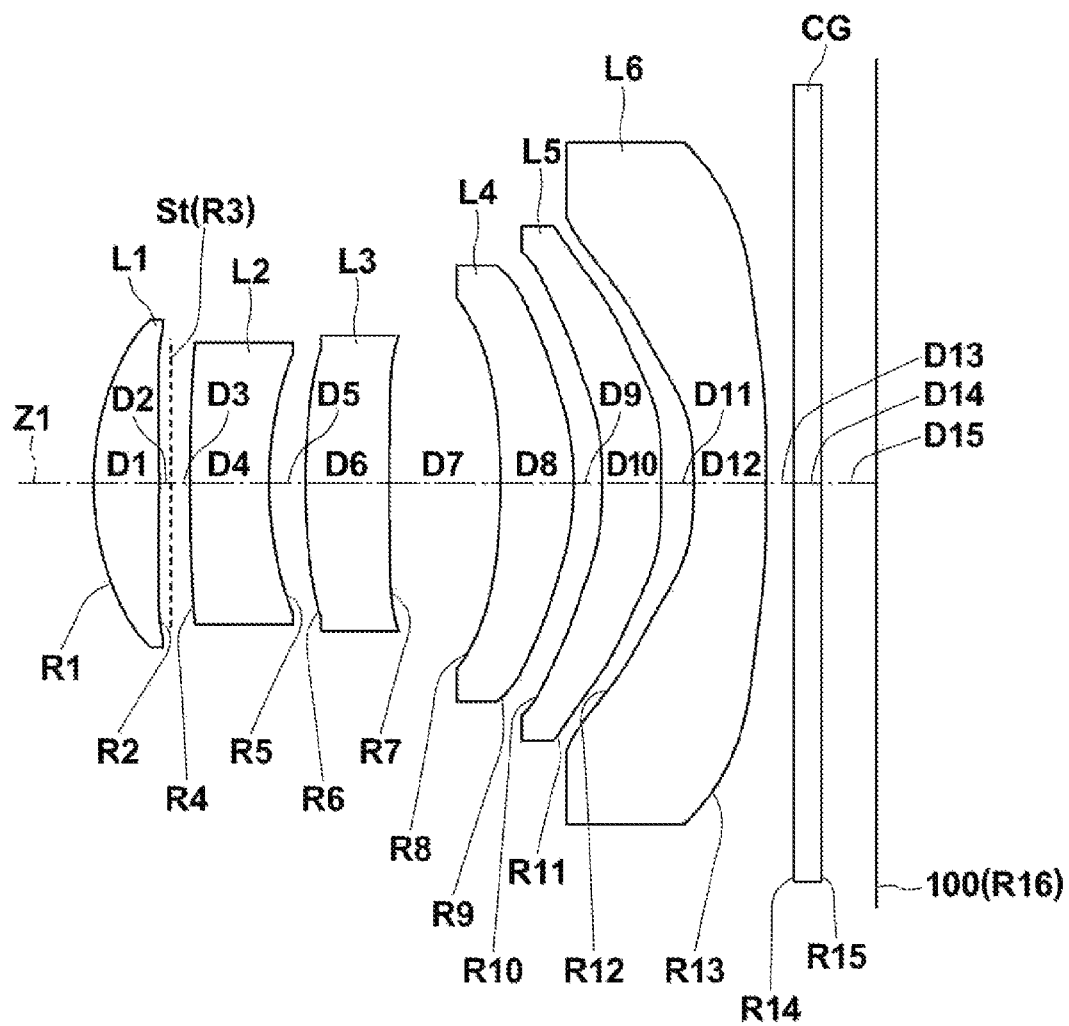
FIG. 3 is a cross-sectional view of an imaging lens according to one embodiment of the present disclosure, illustrating a third configuration example, which corresponds to Example 3.
Figure 4:
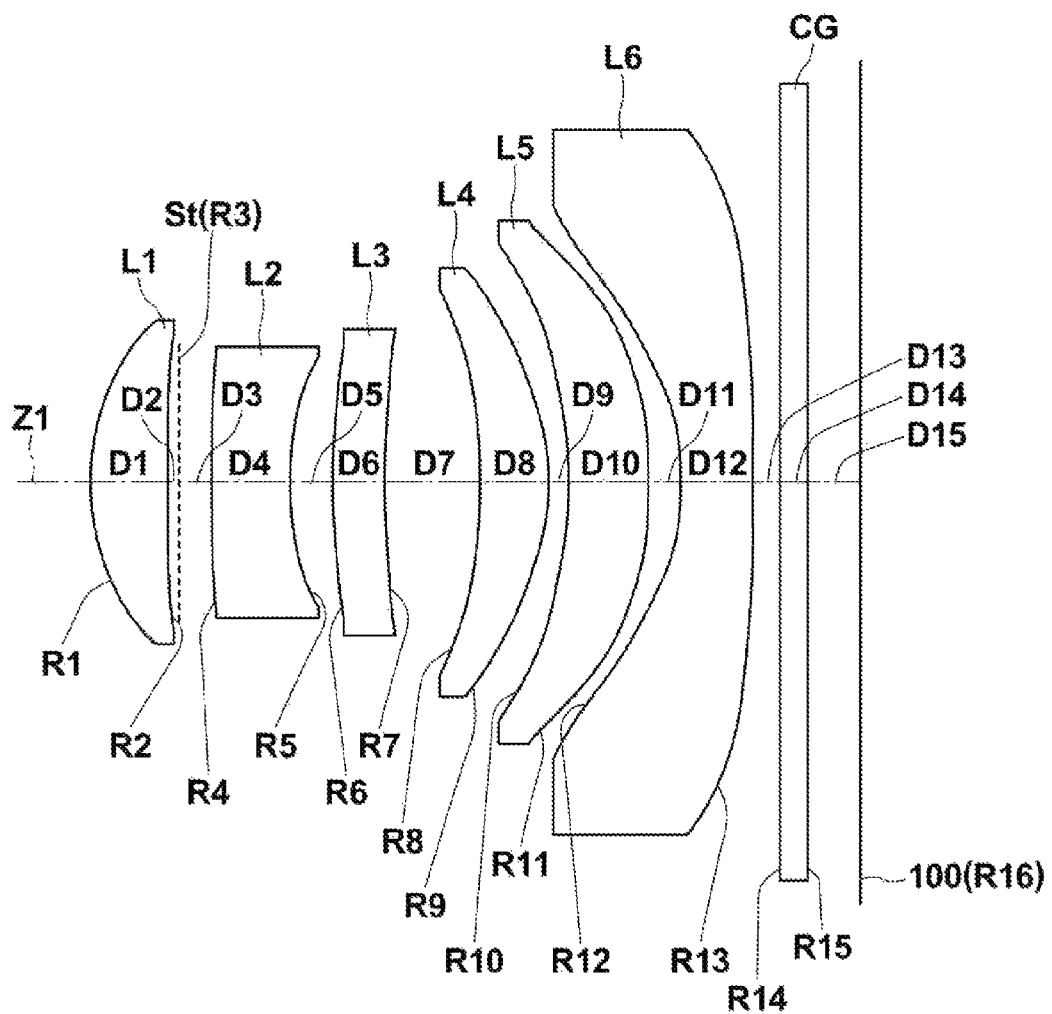
FIG. 4 is a cross-sectional view of an imaging lens according to one embodiment of the present disclosure, illustrating a fourth configuration example, which corresponds to Example 4.
Figure 5:
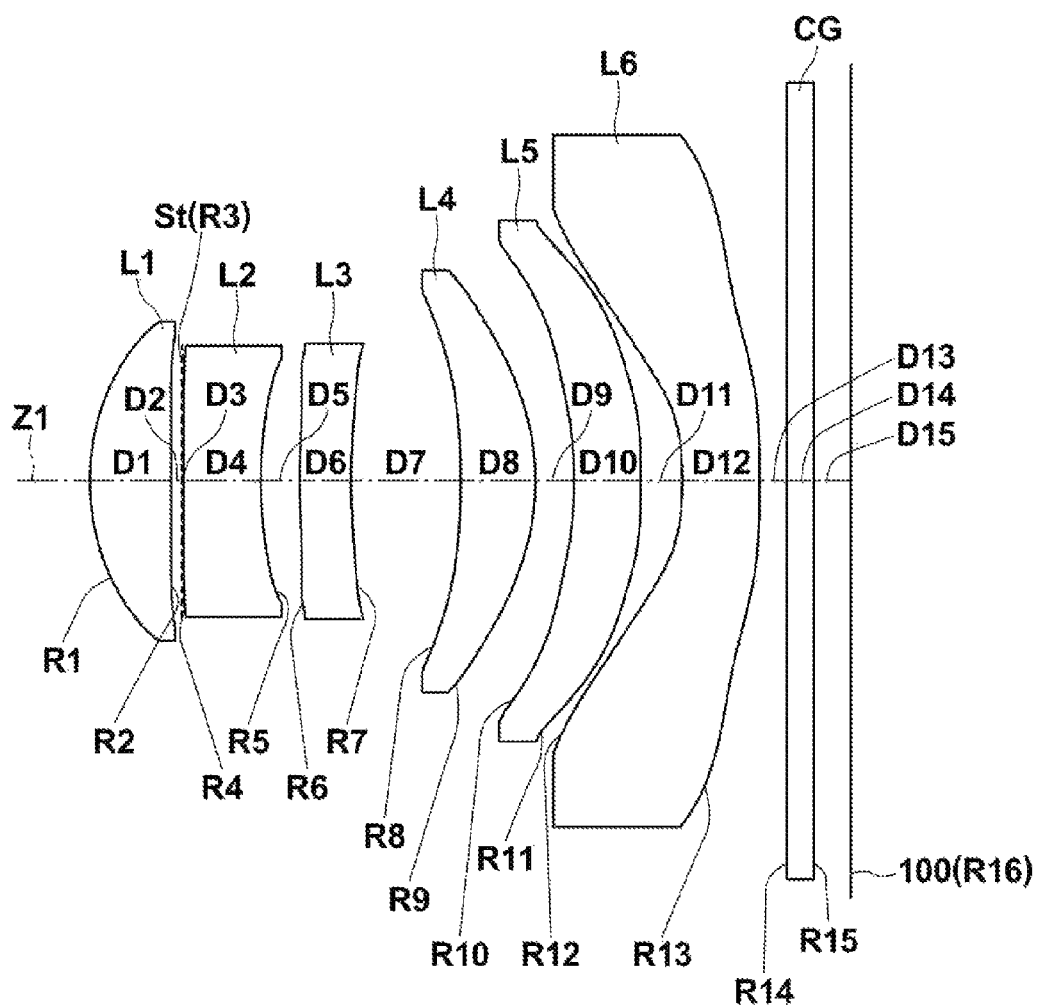
FIG. 5 is a cross-sectional view of an imaging lens according to one embodiment of the present disclosure, illustrating a fifth configuration example, which corresponds to Example 5.
Figure 6:
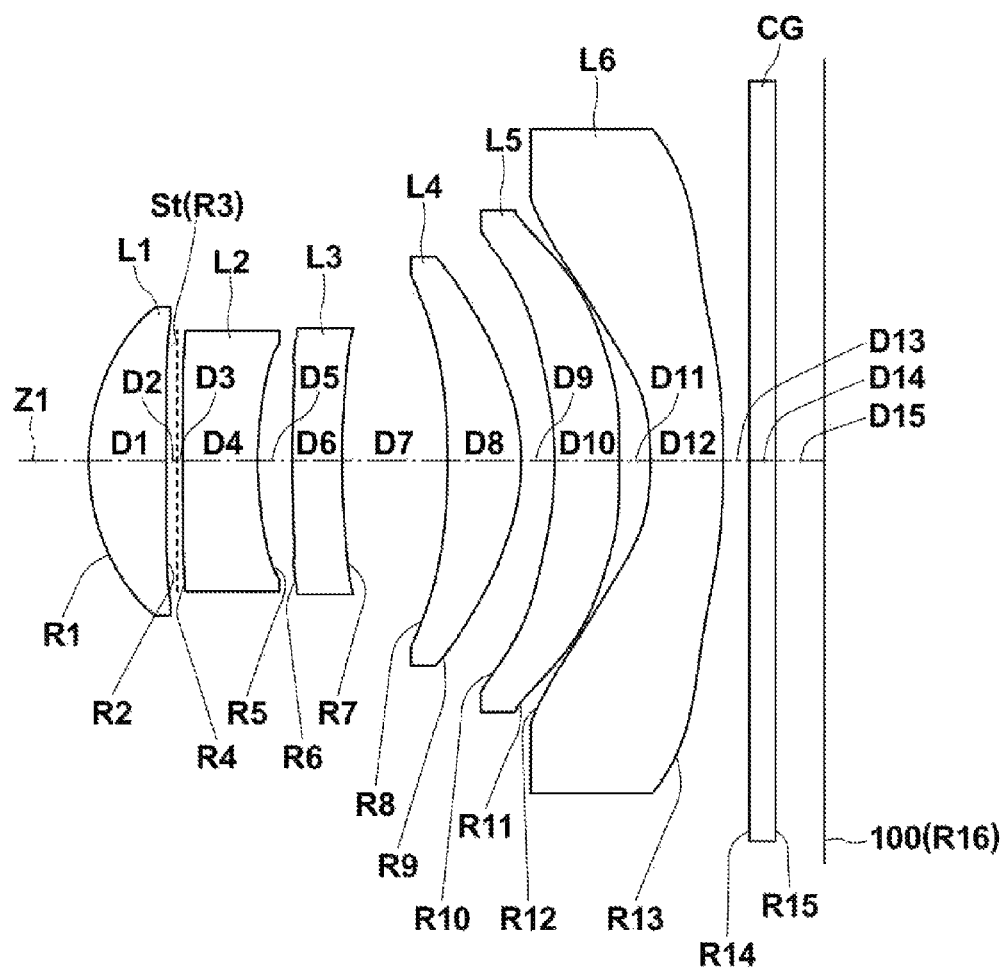
FIG. 6 is a cross-sectional view of an imaging lens according to one embodiment of the present disclosure, illustrating a sixth configuration example, which corresponds to Example 6.
Figure 7:
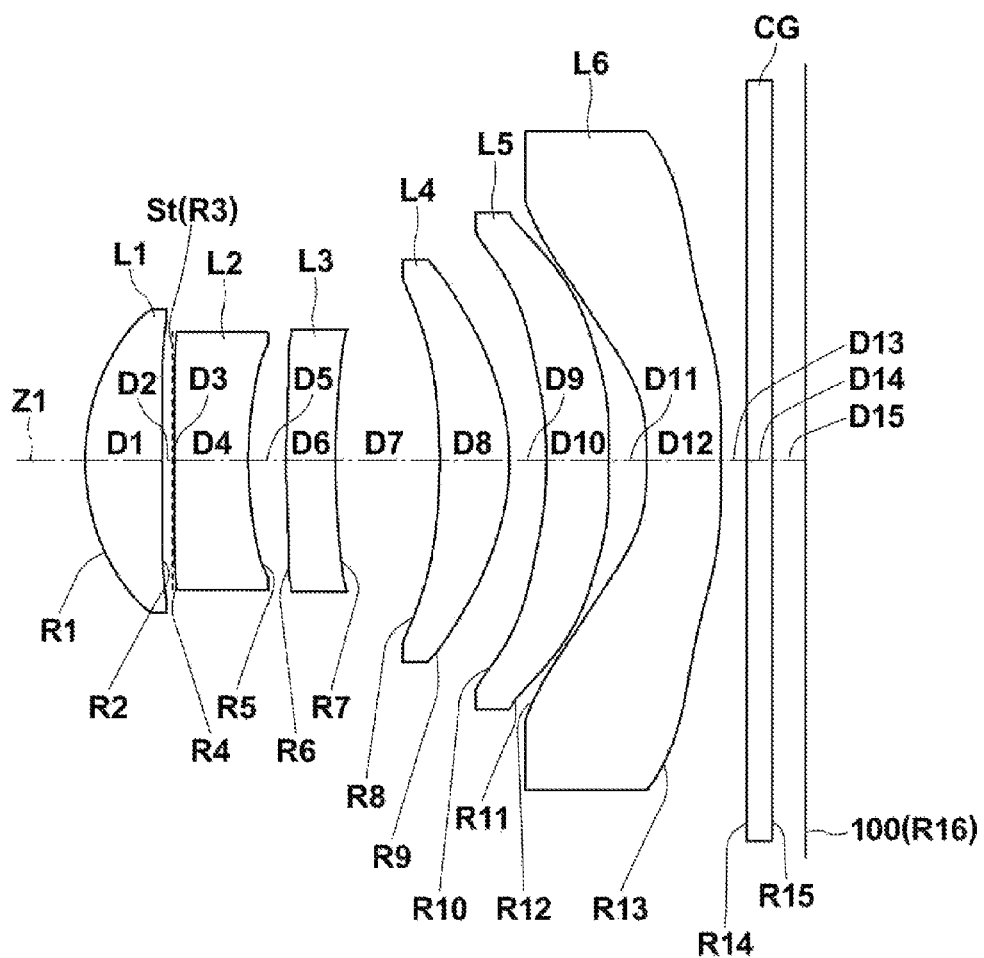
FIG. 7 is a cross-sectional view of an imaging lens according to one embodiment of the present disclosure, illustrating a seventh configuration example, which corresponds to Example 7.
Figure 8:
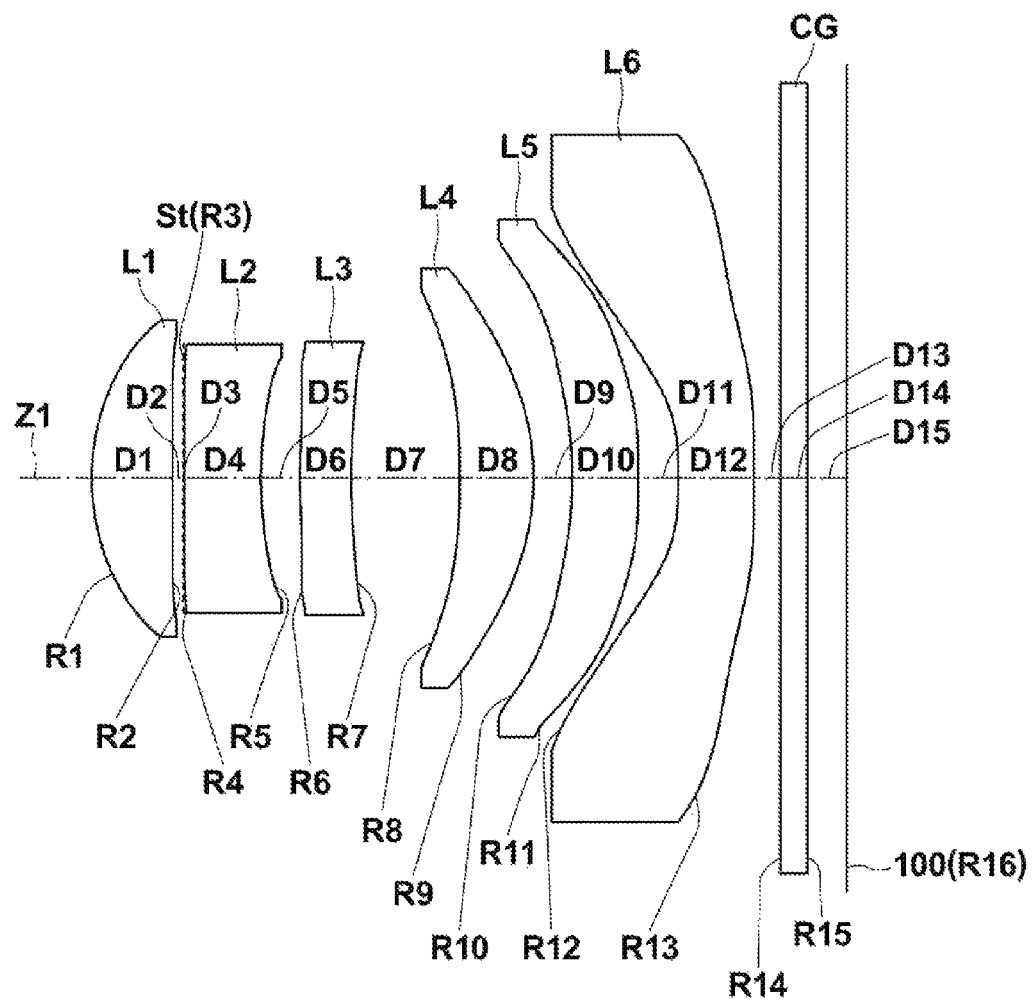
FIG. 8 is a cross-sectional view of an imaging lens according to one embodiment of the present disclosure, illustrating an eighth configuration example, which corresponds to Example 8.
Figure 9:
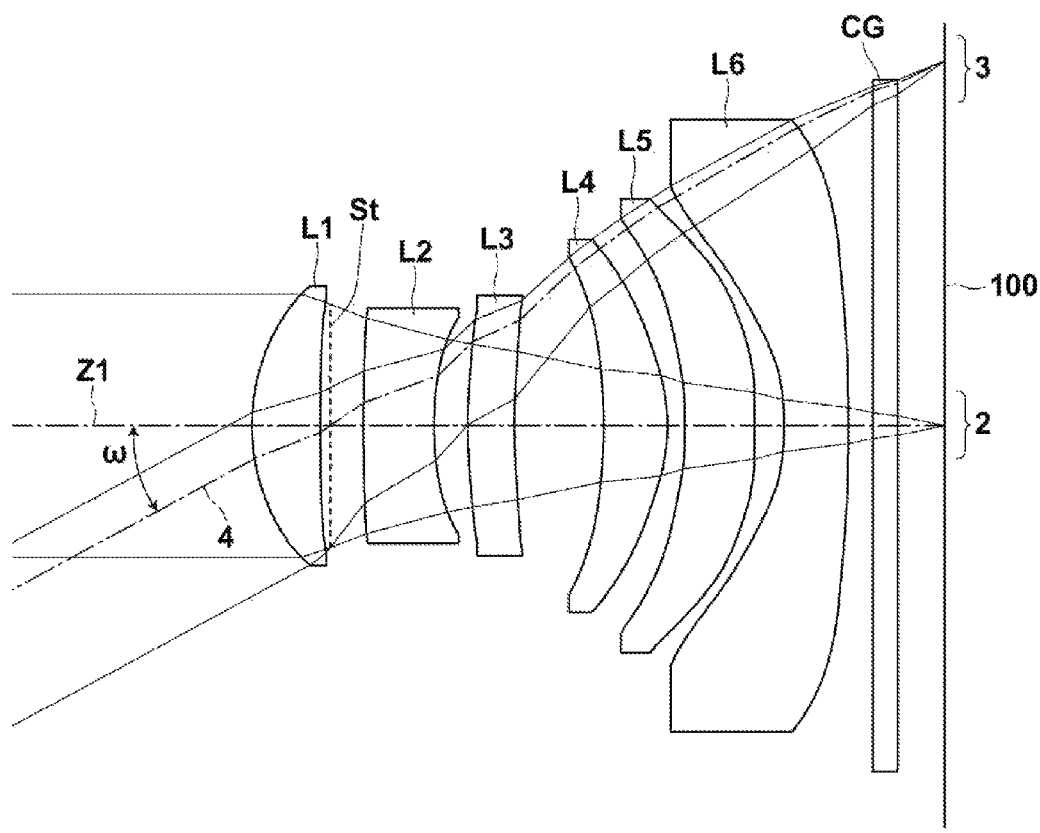
FIG. 9 is a ray diagram of the imaging lens illustrated in FIG. 1.

FIG. 1 illustrates a first configuration example of an imaging lens according to a first embodiment of the present disclosure. This configuration example corresponds to the lens configuration of a first numerical example (Tables 1 and 2) to be described later. Likewise, second to eighth configuration examples in cross-section corresponding to numerical examples (Tables 3 to 16) according to the second to the eighth embodiments, to be described later, are shown in FIG. 2 to FIG. 8 respectively. In FIG. 1 to FIG. 8, the symbol Ri indicates a radius of curvature of $i^{th}$ surface in which a number i is given to each surface in a serially increasing manner toward the image side (imaging side) with the most object side lens element surface being taken as the first surface. The symbol Di indicates a surface distance between $i^{th}$ surface and $(i+1)^{th}$ surface on the optical axis Z1. As the basic configuration of each configuration example is identical, a description will be made, hereinafter, based on the configuration example of imaging lens shown in FIG. 1, and the configuration examples shown in FIG. 2 to FIG. 8 will be described, as required. FIG. 9 is a ray diagram of the imaging lens shown in FIG. 1, illustrating each optical path of an axial light beam 2 and a maximum angle of view light beam 3, and a maximum half angle of view ω when an object at infinity is in focus. Note that the principal ray 4 of the maximum angle of view light beam 3 is illustrated by a dot-and-dash line.

An imaging lens L according to an embodiment of the present disclosure is suitable for use in various types of imaging devices that use image sensors such as, for example, a CCD and a CMOS, in particular, relatively small portable terminal devices, including digital still cameras, surveillance cameras, camera-equipped cell phones, smartphones, tablet terminals, and PDAs. The imaging lens L includes a first lens L1, a second lens L2, a third lens L3, a fourth lens L4, a fifth lens L5, and a sixth lens L6 in order from the object side along the optical axis Z1.

Figure 18:
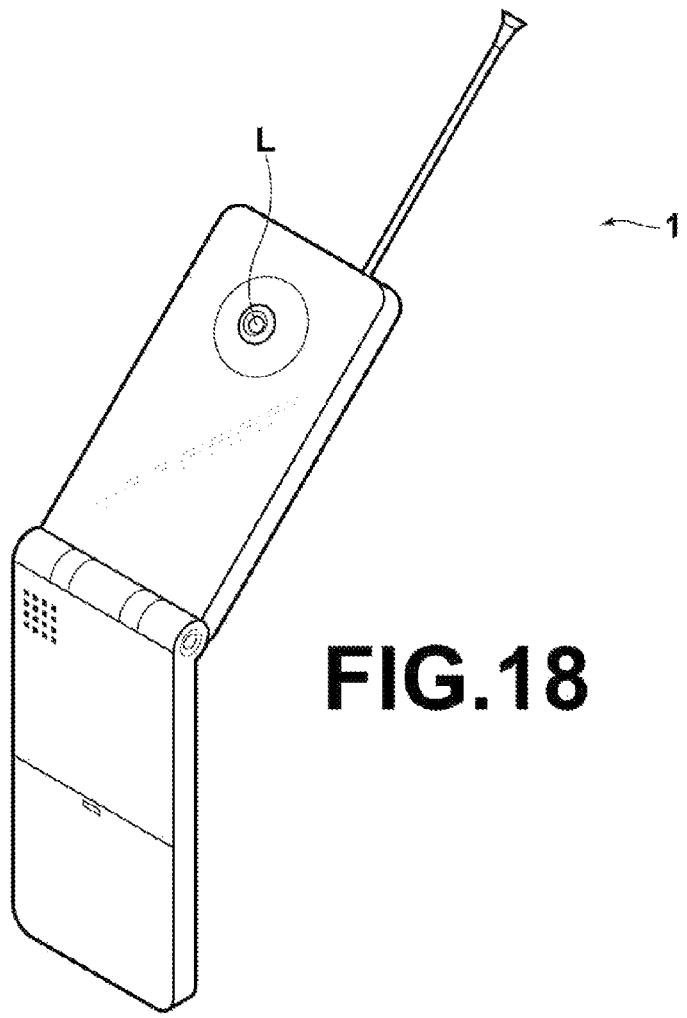
FIG. 18 illustrates an imaging apparatus, which is a cell phone terminal, equipped with the imaging lens according to the present disclosure.

FIG. 18 is a schematic view of a cell phone terminal which is an imaging apparatus 1 according to an embodiment of the present disclosure. The imaging apparatus 1 according to an embodiment of the present disclosure includes the imaging lens L according to the present embodiment and an image sensor 100 (refer to FIG. 1 to FIG. 8), such as a CCD, that outputs an imaging signal according to an optical image formed by the imaging lens L. The image sensor 100 is disposed on the imaging surface (image plane R16 in FIG. 1 to FIG. 8) of the imaging lens L.

Figure 19:
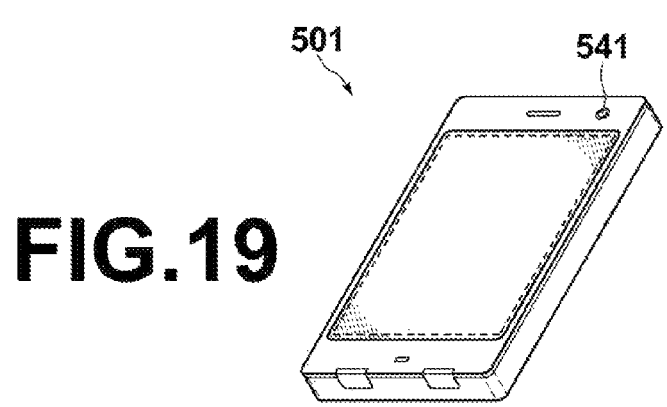
FIG. 19 illustrates an imaging apparatus, which is a smartphone, equipped with the imaging lens according to the present disclosure.

FIG. 19 is a schematic view of a smartphone which is an imaging apparatus 501 according to an embodiment of the present disclosure. The imaging apparatus 501 according to an embodiment of the present disclosure includes a camera section 541 which includes the imaging lens L according to the present embodiment and an image sensor 100 (refer to FIG. 1 to FIG. 8), such as a CCD, that outputs an imaging signal according to an optical image formed by the imaging lens L. The image sensor 100 is disposed on the image plane (imaging surface) of the imaging lens L.

Various types of optical members CG may be disposed between the sixth lens L6 and the image sensor 100 according to the camera side structure to which the lens is mounted. For example, a plate-like optical member, for example, a cover glass for protecting the imaging surface or an infrared cut filter may be disposed. In this case, for example, a plate-like cover glass with a coating having a filtering effect, such as an infrared cut filter or an ND filter, or with a material having an identical effect may be used as the optical member CG.

Further, an effect comparable to that of the optical member CG may be given by applying a coating on the sixth lens L6, without using the optical member CG. This allows a reduction in the number of parts and the overall length.

Preferably, the imaging lens L includes an aperture stop St disposed on the object side of the object side surface of the second lens L2. Disposing the aperture stop St in such a manner may prevent incident angles of light rays passing through the optical system from increasing with respect to the image plane (image sensor), in particular, in a peripheral portion of the imaging area. The term "disposed on the object side of the object side surface of the second lens L2" as used herein refers to that the position of the aperture stop St in an optical axis direction is located at the same position as the intersection between the axial marginal ray and the object side surface of the second lens L2 or on the object side of the intersection. The aperture stop St shown here does not necessarily represent the size or the shape but indicates the position on the optical axis Z1.

The first lens L1 has a positive refractive power near the optical axis. This allows a satisfactory reduction in overall lens length. Further, the first lens L1 has a convex surface on the object side near the optical axis. Forming the object side surface of the first lens L1, which is the most object side lens of the imaging lens L, in a convex shape, as described above, makes it easy to shift the rear principal point of the first lens L1 to the object side, which is advantageous for overall lens length reduction. Further, the first lens L1 may have a biconvex shape near the optical axis. In this case, the positive refractive power may be shared by the object side surface and the image side surface of the first lens L1 to secure a positive refractive power within a range in which the absolute values of the paraxial radii of curvature of the object side surface and the image side surface become too small, whereby generation of spherical aberration may be suppressed. Still further, the first lens L1 may have a meniscus shape with a convex surface on the object side near the optical axis. In this case, it is easier to shift the rear principal point of the first lens L1 to the object side, which is more advantageous for overall lens length reduction.

The second lens L2 has a negative refractive power near the optical axis. This allows spherical aberration and longitudinal chromatic aberration to be corrected satisfactorily. Preferably, the second lens L2 has a meniscus shape with a convex surface on the object side near the optical axis. In this case, generation of spherical aberration may be suppressed appropriately and astigmatism may be corrected satisfactorily.

The third lens L3 may have a negative or positive refractive power near the optical axis if it is capable of correcting various aberrations generated while light rays pass through the imaging lens L in a well-balanced manner. The third lens L3 has a convex surface on the object side near the optical axis. This is advantageous for overall lens length reduction. For example, if the third lens L3 has a positive refractive power near the optical axis, the positive refractive power of the imaging lens L is secured due to that the third lens L3 has a convex surface on the object side near the optical axis, which is advantageous for overall lens length reduction. If the third lens L3 has a negative refractive power near the optical axis, it is easy to shift the rear principal point of the third lens L3 to the object side due to that the third lens L3 has a meniscus shape with a convex surface on the object side near the optical axis, which is advantageous for overall lens length reduction. Preferably, the third lens L3 has a meniscus shape with a convex surface on the object side near the optical axis. In this case, generation of spherical aberration may further be suppressed, while appropriately reducing the overall lens length.

Preferably, the fourth lens L4 has a positive refractive power near the optical axis. In this case, the overall lens length may be reduced appropriately. Preferably, the fourth lens IA has a meniscus shape with a concave surface on the object side near the optical axis. In this case, generation of astigmatism may be suppressed appropriately.

The fifth lens L5 has a negative refractive power near the optical axis. In addition, the sixth lens L6 has a negative refractive power near the optical axis. Sharing the negative refractive power of the imaging lens L by the fifth lens L5 and the sixth lens L6 adjacently located at positions relatively close to the imaging surface among the lenses constituting the imaging lens L may prevent the incident angles of light rays passing through the optical system from increasing with respect to the image plane (image sensor), in particular, in a peripheral portion of the imaging area. Preferably, the fifth lens L5 has a concave surface on the object side near the optical axis. In this case, astigmatism may be corrected satisfactorily. Further, if the fifth lens L5 has a meniscus shape with a concave surface on the object side near the optical axis, astigmatism may be corrected more satisfactorily. Still further, the fifth lens L5 may have a biconcave shape near the optical axis. In this case, the refractive power may be shared by the object side surface and the image side of the fifth lens L5 to prevent the absolute values of the paraxial radii of curvature of the object side surface and the image side surface of the fifth lens L5 from being too small, whereby generation of spherical aberration may be suppressed.

The sixth lens L6 has a negative refractive power near the optical axis, as described above. Giving a negative refractive power to the sixth lens L6, which is the lens disposed on the most image side of the imaging lens L, near the optical axis allows the rear principal point of the imaging lens L to be shifted to the object side, whereby the overall lens length may be reduced appropriately. Preferably, the sixth lens L6 has a concave surface on the object side near the optical axis. In this case, incident angles of light rays passing through the optical system with respect to the image plane (image sensor) are prevented appropriately from increasing at a low angle of view and distortion may be corrected satisfactorily. Further, the sixth lens L6 may have a biconcave shape near the optical axis. This allows field curvature to be corrected satisfactorily, while securing the negative refractive power of the sixth lens L6 by both of the object side surface and image side surface of the sixth lens L6. Still further, the sixth lens L6 may have a meniscus shape with a concave surface on the object side near the optical axis. In this case, incident angles of light rays passing through the optical system are prevented more appropriately from increasing with respect to the image plane (image sensor) at a low angle of view, and astigmatism may be corrected satisfactorily.

The use of single lenses for the first lens L1 to the sixth lens L6 constituting the imaging lens L described above may increase the number of lens surfaces in comparison with the case where a cemented lens is used for any of the first lens L1 to the sixth lens L6, whereby design flexibility may be increased and the overall lens length may be reduced appropriately.

According to the imaging lens L described above, the configuration of each lens element is optimized in a lens configuration of six elements in total. This allows realization of a lens system, despite a telephoto type imaging lens, which is reduced in overall lens length and has high imaging performance from the central angle of view to the peripheral angle of view, conforming to a higher pixelation.

Preferably, each of the first lens L1 to the sixth lens L6 of the imaging lens L has an aspherical shape on at least one surface for higher performance of the imaging lens L.

Next, operations and effects of the imaging lens L configured in the manner described above will be described in further detail with respect to conditional expressions. Preferably, the imaging lens L satisfies any one or any combination of the following conditional expressions. Preferably, a conditional expression to be satisfied by the imaging lens L is selected, as appropriate, according to the requirements of the imaging lens L.

Preferably, the focal length f1 of the first lens L1 and the focal length f of the entire system satisfy the following conditional expression (1):

$$1.55 < f/f1 < 2.5 \qquad (1).$$

The conditional expression (1) defines a preferable numerical range of the ratio of the focal length f of the entire system with respect to the focal length f1 of the first lens L1. Securing the refractive power of the first lens L1 such that the value of the conditional expression (1) remains above the lower limit may prevent the positive refractive power of the first lens L1 from being too weak relative to the refractive power of the entire system, whereby the entire lens length may be reduced appropriately.

Suppressing the refractive power of the first lens L1 such that the value of the conditional expression (1) remains below the upper limit may prevent the positive refractive power of the first lens L1 from being too strong relative to the refractive power of the entire system, whereby generation of astigmatism and spherical aberration may be suppressed satisfactorily, which is advantageous for realizing a small F-number. In order to further enhance the foregoing effects, it is preferable that the following conditional expression (1-1) is satisfied, and more preferable that the following conditional expression (1-2) is satisfied:

$$1.6 < f/f1 < 2.2 \qquad (1-1)$$

$$1.65 < f/f1 < 2 \qquad (1-2).$$

Preferably, the focal length f2 of the second lens L2 and the focal length f of the entire system satisfy the following conditional expression (2):

$$-1.65 < f/f2 < -0.8 \qquad (2).$$

The conditional expression (2) defines a preferable numerical range of the ratio of the focal length f of the entire system with respect to the focal length f2 of the second lens L2. Suppressing the refractive power of the second lens L2 such that the value of the conditional expression (2) remains above the lower limit may prevent the refractive power of the second lens L2 from being too strong relative to the refractive power of the entire system, whereby the overall lens length may be reduced appropriately. Securing the refractive power of the second lens L2 such that the value of the conditional expression (2) remains below the upper limit may prevent the refractive power of the second lens L2 from being too weak relative to the refractive power of the entire system, whereby spherical aberration and longitudinal chromatic aberration may be corrected appropriately, which is advantageous for realizing a small F-number. In order to further enhance the foregoing effects, it is preferable that the following conditional expression (2-1) is satisfied, and more preferable that the following conditional expression (2-2) is satisfied:

$$-1.6 < f/f2 < -0.9 \qquad (2-1)$$

$$-1.5 < f/f2 < -1 \qquad (2-2).$$

Preferably, the focal length f4 of the fourth lens L4 and the focal length f of the entire system satisfy the following conditional expression (3):

$$0.5 < f/f4 < 1.7 \qquad (3).$$

The conditional expression (3) defines a preferable numerical range of the ratio of the focal length f of the entire system with respect to the focal length f4 of the fourth lens L4. Securing the refractive power of the fourth lens L4 such that the value of the conditional expression (3) remains above the lower limit may prevent the positive refractive power of the fourth lens L4 from being too weak relative to the refractive power of the entire system, whereby the overall lens length may be reduced appropriately. Suppressing the refractive power of the fourth lens L4 such that the value of the conditional expression (3) remains below the upper limit may prevent the positive refractive power of the fourth lens L4 from being too strong relative to the refractive power of the entire system, whereby spherical aberration and longitudinal chromatic aberration may be corrected appropriately. In order to further enhance the foregoing effects, it is preferable that the following conditional expression (3-1) is satisfied, and more preferable that the following conditional expression (3-2) is satisfied:

$$0.7 < f/f4 < 1.6 \quad (3\text{-}1)$$

$$0.8 < f/f4 < 1.5 \quad (3\text{-}2).$$

Preferably, the focal length f6 of the sixth lens L6 and the focal length f of the entire system satisfy the following conditional expression (4):

$$1.5 < f/f6 < -0.3 \quad (4).$$

The conditional expression (4) defines a preferable numerical range of the ratio of the focal length f of the entire system with respect to the focal length f6 of the sixth lens L6. Suppressing the refractive power of the sixth lens L6 such that the value of the conditional expression (4) remains above the lower limit may prevent the refractive power of the sixth lens L6 from being too strong relative to the refractive power of the entire system, whereby incident angles of light rays passing through the optical system from increasing with respect to the image plane (image sensor), in particular, in a peripheral portion of the imaging area. Securing the refractive power of the sixth lens L6 such that the value of the conditional expression (4) remains below the upper limit may prevent the refractive power of the sixth lens L6 from being too weak relative to the refractive power of the entire system, whereby the overall lens length may be reduced more appropriately. In order to further enhance the foregoing effects, it is preferable that the following conditional expression (4-1) is satisfied, and more preferable that the following conditional expression (4-2) is satisfied:

$$-1.3 < f/f6 < -0.4 \quad (4\text{-}1)$$

$$-1.2 < f/f6 < -0.5 \quad (4\text{-}2).$$

Preferably, the paraxial radius of curvature L4f of the object side surface of the fourth lens L4 and the paraxial radius of curvature L4r of the image side surface of the fourth lens L4 satisfy the following conditional expression (5):

$$-5 < (L4r+L4f)/(L4r-L4f) < -1.5 \quad (5).$$

The conditional expression (5) defines a preferable numerical range for the paraxial radius of curvature L4f of the object side surface of the fourth lens L4 and the paraxial radius of curvature L4r of the image side surface of the fourth lens L4. Forming the fourth lens L4 such that the value of the conditional expression (5) remains above the lower limit may prevent the absolute value of the paraxial radius of curvature of the image side surface of the fourth lens L4 from being too small, whereby spherical aberration may be corrected satisfactorily. Forming the fourth lens L4 such that the value of the conditional expression (5) remains below the upper limit may prevent the absolute value of the paraxial radius of curvature of the object side surface of the fourth lens L4 from being too small, whereby astigmatism may be corrected satisfactorily. In order to further enhance the foregoing effects, it is preferable that the following conditional expression (5-1) is satisfied:

$$-3.5 < (L4r+L4f)/(L4r-L4f) < -1.6 \quad (5\text{-}1).$$

As described above, according to the imaging lens L of an embodiment of the present disclosure, the configuration of each lens element is optimized in a lens configuration of six elements in total. This allows realization of a lens system, despite a telephoto type imaging lens, which is reduced in overall lens length and has high imaging performance from the central angle of view to the peripheral angle of view, conforming to a higher pixelation.

Satisfying a preferable condition, as appropriate, allows a higher imaging performance to be realized. According to the imaging apparatus of the present embodiment, a high resolution captured image may be obtained from the central angle of view to the peripheral angle of view, since the apparatus is configured to output an imaging signal according to an optical image formed by the imaging lens having high performance of the present embodiment.

When the focal length of the entire system is taken as f and the distance from the object side surface of the first lens L1 to the image plane on the optical axis, in which the back focus is calculated in terms of air equivalent length, is taken as TTL, if the first lens L1 to the sixth lens L6 are configured such that TTL/f is 1.1 or less, as in, for example, the imaging lenses L according to the first to the eighth embodiments, the imaging lens, despite a telephoto type imaging lens, may respond appropriately to the demand for overall lens length reduction in imaging devices, such as smartphones, tablet terminals, and the like. Further, if the first lens L1 to the sixth lens L6 of the imaging lens L are configured such that the imaging lens L has an F-number less than or equal to 2.6, the imaging lens L may also respond to the demand for realizing a small F-number in imaging devices, such as smartphones, tablet terminals, and the like. According to each of the first to eighth embodiments, the first lens L1 to the sixth lens L6 of the imaging lens L are configured such that the imaging lens L has an F-number less than or equal to 2.6, so that the imaging lens L may appropriately respond to the demand for realizing a small F-number.

Next, specific numerical examples of imaging lenses according to the embodiments of the present disclosure will be described. Hereinafter, a plurality of numerical examples is described collectively.

Tables 1 and 2, to be described later, show specific lens data corresponding to the configuration of the imaging lens illustrated in FIG. 1. More specifically, Table 1 shows basic lens data, while Table 2 shows aspherical surface data. The surface number Si column in the lens data shown in Table 1 indicates $i^{th}$ surface number of the imaging lens according to Example 1 in which a number i is given to each surface in a serially increasing manner toward the image side with the object side surface of the most object side optical element being taken as the first surface. The radius of curvature Ri column indicates the value (mm) of radius of curvature of $i^{th}$ surface from the object side in relation to the symbol Ri given in FIG. 1. Likewise, the surface distance Di column indicates the surface distance (mm) on the optical axis between $i^{th}$ surface Si and $(i+1)^{th}$ surface Si+1. The Ndj column indicates the value of the refractive index of $j^{th}$ optical element from the object side with respect to the d-line (wavelength 587.6 nm) and the vdj column indicates the value of the Abbe number of $j^{th}$ optical element from the object side with respect to the d-line.

Table 1 also includes the aperture stop St and the optical member CG. In Table 1, the term (St) is indicated in the surface number column of the surface corresponding to the aperture stop St in addition to the surface number, and the term (IMG) is indicated in the surface number column of the surface corresponding to the image plane in addition to the surface number. The sign of the radius of curvature is positive if the surface shape is convex on the object side and negative if it is convex on the image side. As various types of data, values of focal length f (mm) of the entire system, back focus Bf (mm), F-number Fno., maximum angle of view 2ω (°) when an object at infinity is in focus, and ratio of distance TTL from the object side surface of the first lens L1 to the image plane on the optical axis with respect to the focal length f of the entire system are given in the upper margin of each lens data. Note that the back focus Bf represents an air equivalent length. Further, in the distance TTL from the object side surface of the first lens L1 to the image plane on the optical axis, the back focus is calculated in terms of air equivalent length.

In the imaging lens according to Example 1, both surfaces of the first lens L1 to the sixth lens L6 have aspherical surface shapes. As the radii of curvature of these aspherical surfaces, the basic lens data of Table 1 show numerical values of radii of curvature near the optical axis (paraxial radii of curvature).

Table 2 shows aspherical surface data of the imaging lens of Example 1. In a numerical value shown as aspherical surface data, the symbol "E" indicates that the subsequent numerical value is an "exponent" to base 10 and the numerical value preceding "E" is multiplied by the numerical value represented by the exponent to base 10. For example, "1.0E−02" represents "$1.0 \times 10^{-2}$".

As for the aspherical surface data, values of each coefficient An and KA in an aspherical surface shape formula represented by the following formula (A) are indicated. More specifically, Z indicates the length (mm) of a vertical line from a point on the aspheric surface at a height Ii to a tangential plane of the vertex of the aspherical surface (plane orthogonal to the optical axis).

$$Z = \frac{C \times h^2}{1 + \sqrt{1 - KA \times C^2 \times h^2}} + \sum_n An \times h^n \quad (A)$$

where:
Z: depth of the aspherical surface (mm)
h: distance from the optical axis to the lens surface (height) (mm)
C: paraxial curvature=1/R (R: paraxial radius of curvature)
An: $n^{th}$ order aspherical surface coefficient (n is an integer not less than 3)
KA: aspherical surface coefficient As in the foregoing imaging lens of Example 1, specific lens data corresponding to the imaging lens configurations illustrated in FIG. 2 to FIG. 8 are given in Tables 3 to 16, as Examples 2 to 8. In the imaging lenses according to Example 1 to 8, both surfaces of the first lens L1 to the sixth lens L6 have aspherical shapes.

Figure 10:
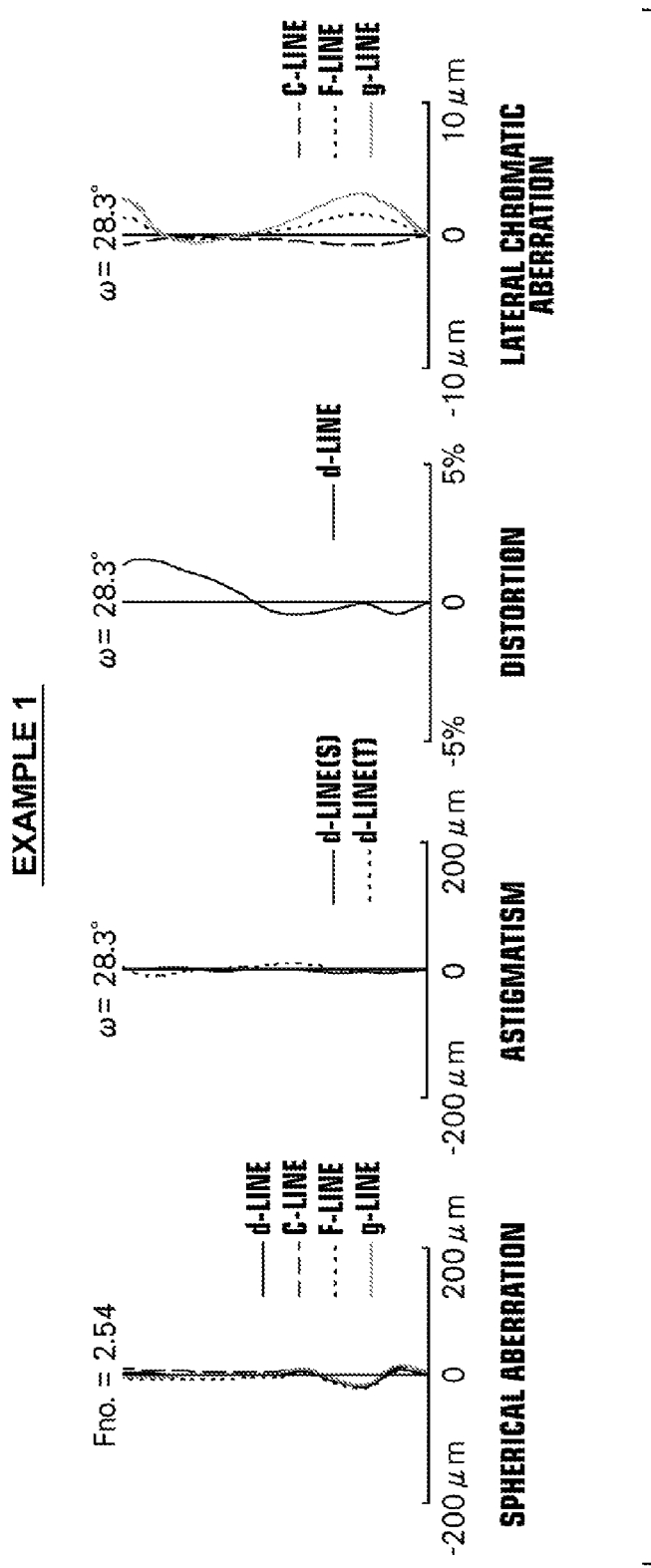
FIG. 10 shows aberration diagrams of the imaging lens according to Example 1 of the present disclosure, in which spherical aberration, astigmatism, distortion, and lateral chromatic aberration are illustrated in order from the left.
Figure 11:
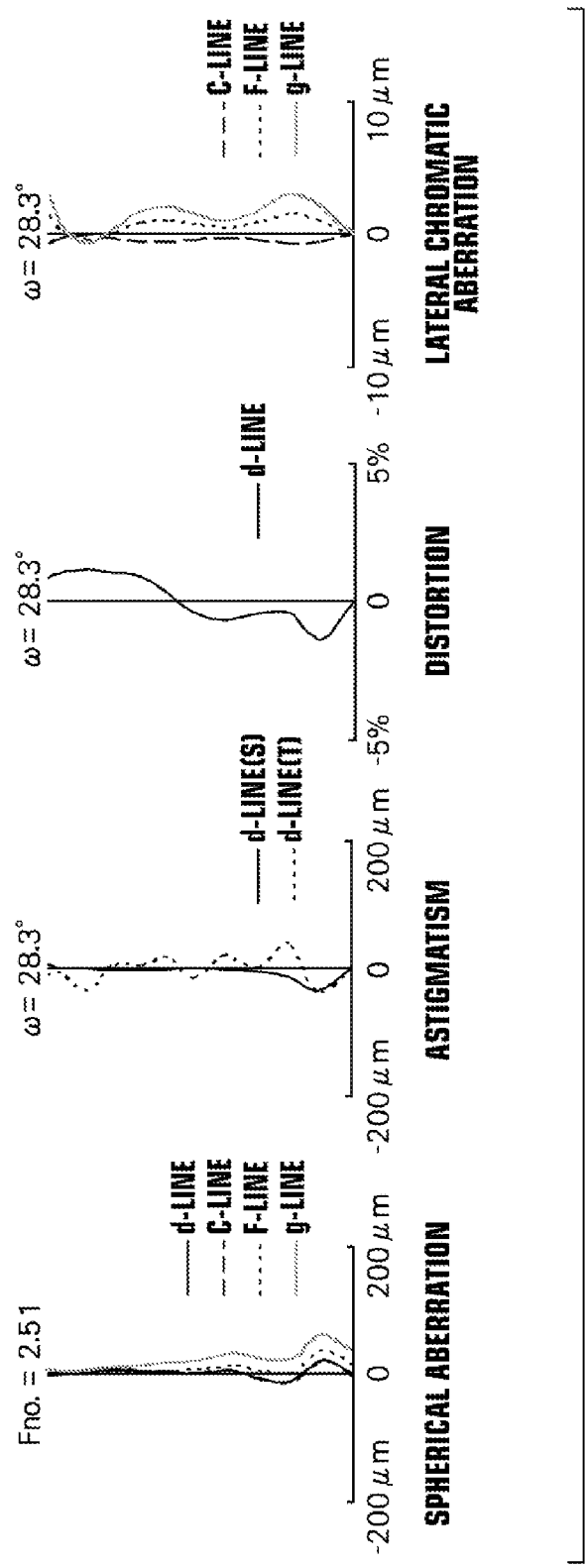
FIG. 11 shows aberration diagrams of the imaging lens according to Example 2 of the present disclosure, in which spherical aberration, astigmatism, distortion, and lateral chromatic aberration are illustrated in order from the left.
Figure 12:
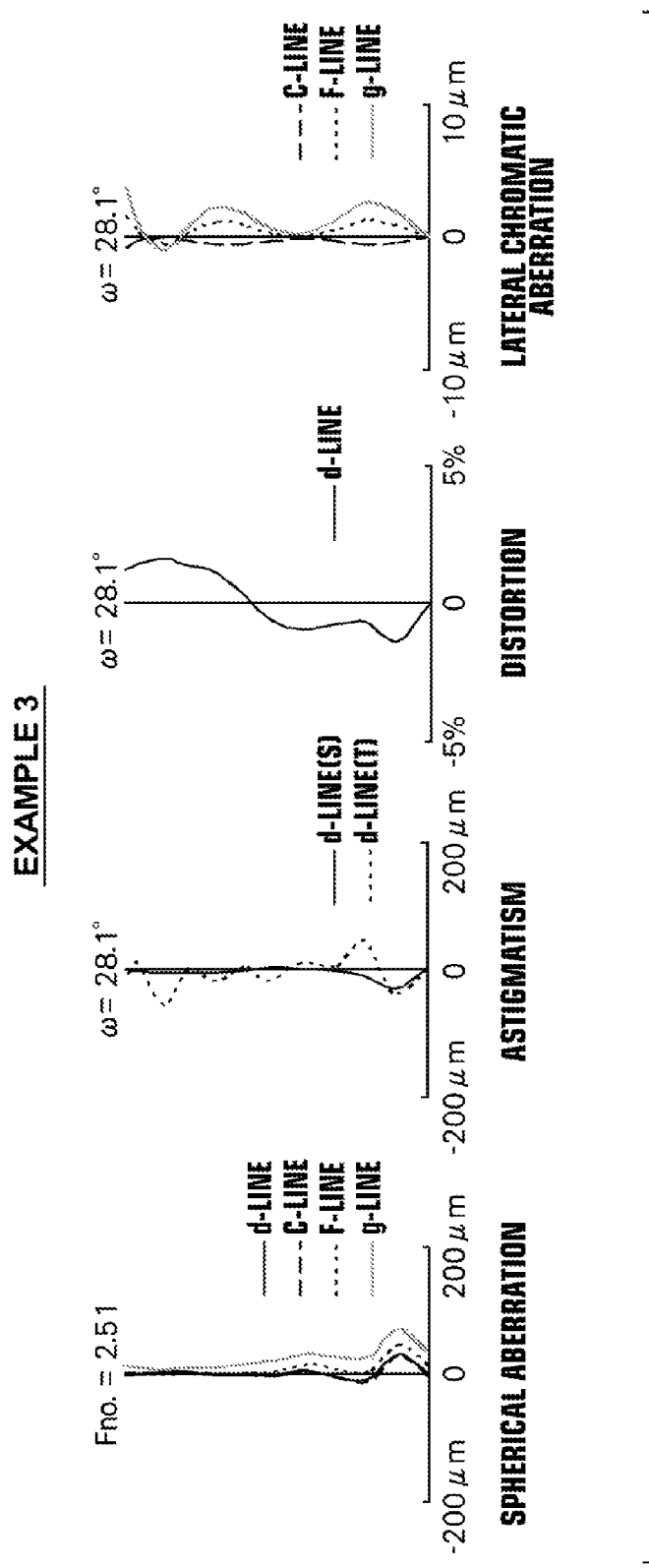
FIG. 12 shows aberration diagrams of the imaging lens according to Example 3 of the present disclosure, in which spherical aberration, astigmatism, distortion, and lateral chromatic aberration are illustrated in order from the left.
Figure 13:
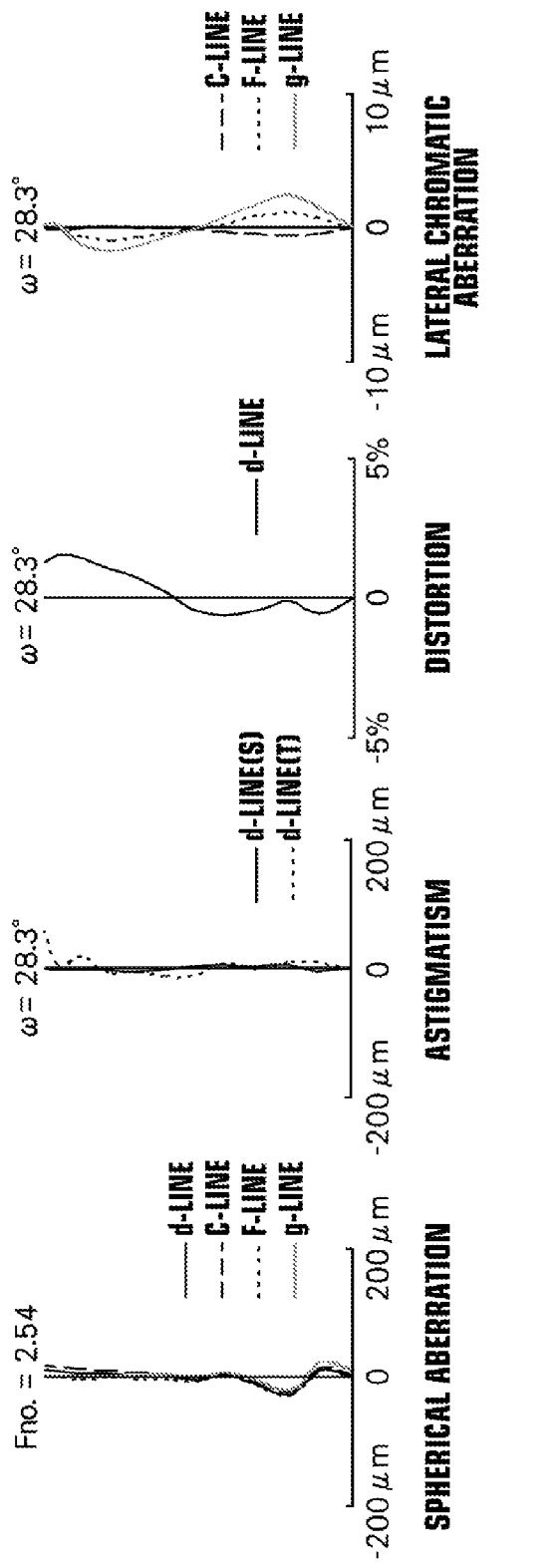
FIG. 13 shows aberration diagrams of the imaging lens according to Example 4 of the present disclosure, in which spherical aberration, astigmatism, distortion, and lateral chromatic aberration are illustrated in order from the left.
Figure 14:
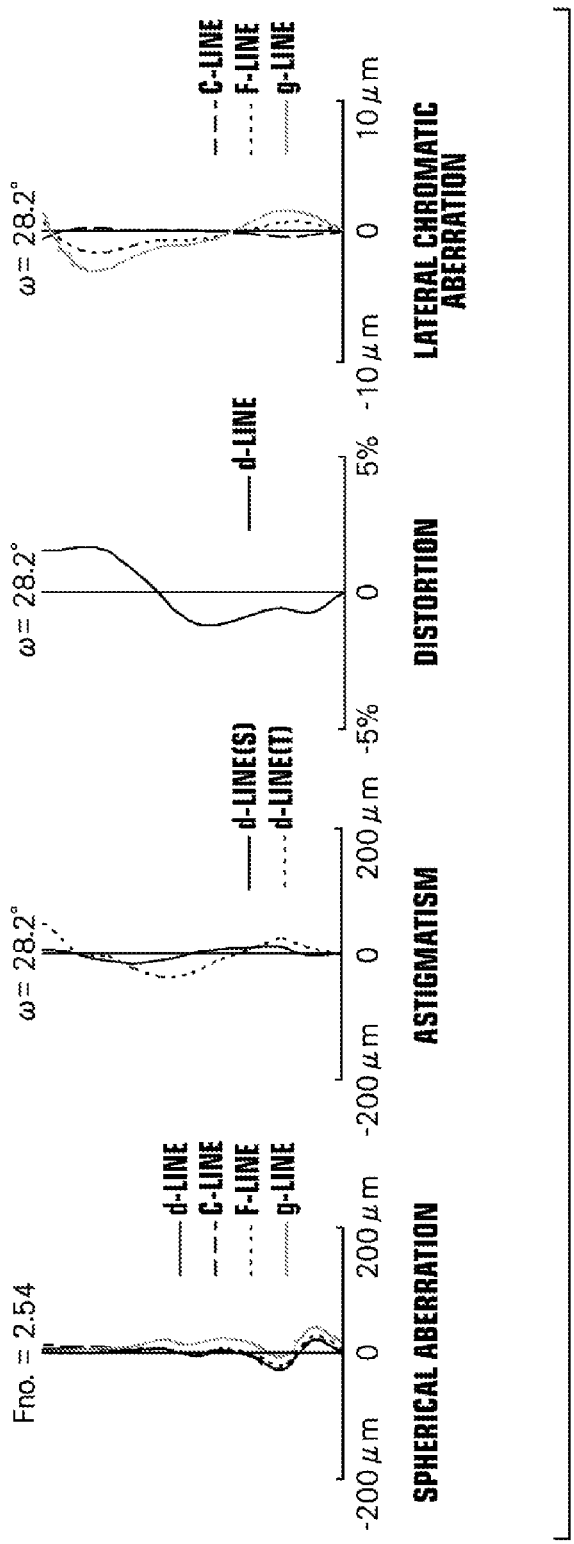
FIG. 14 shows aberration diagrams of the imaging lens according to Example 5 of the present disclosure, in which spherical aberration, astigmatism, distortion, and lateral chromatic aberration are illustrated in order from the left.
Figure 15:
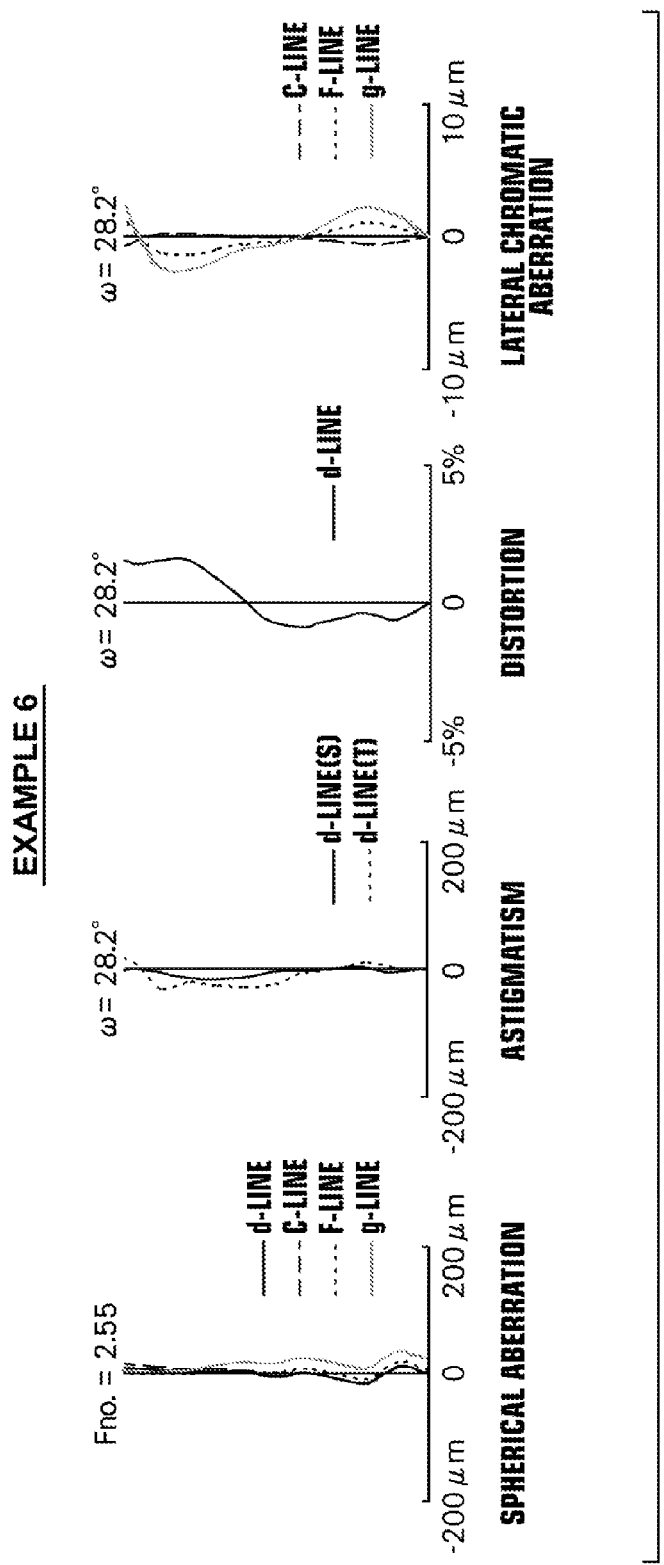
FIG. 15 shows aberration diagrams of the imaging lens according to Example 6 of the present disclosure, in which spherical aberration, astigmatism, distortion, and lateral chromatic aberration are illustrated in order from the left.
Figure 16:
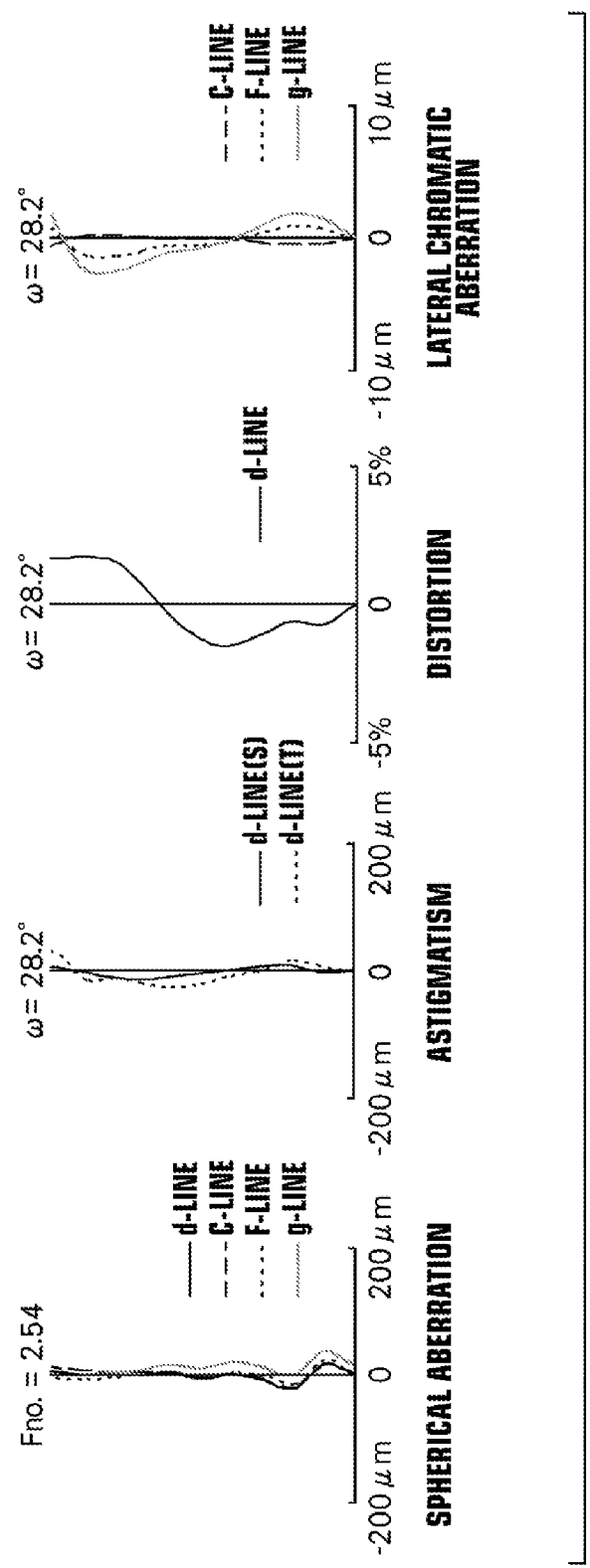
FIG. 16 shows aberration diagrams of the imaging lens according to Example 7 of the present disclosure, in which spherical aberration, astigmatism, distortion, and lateral chromatic aberration are illustrated in order from the left.
Figure 17:
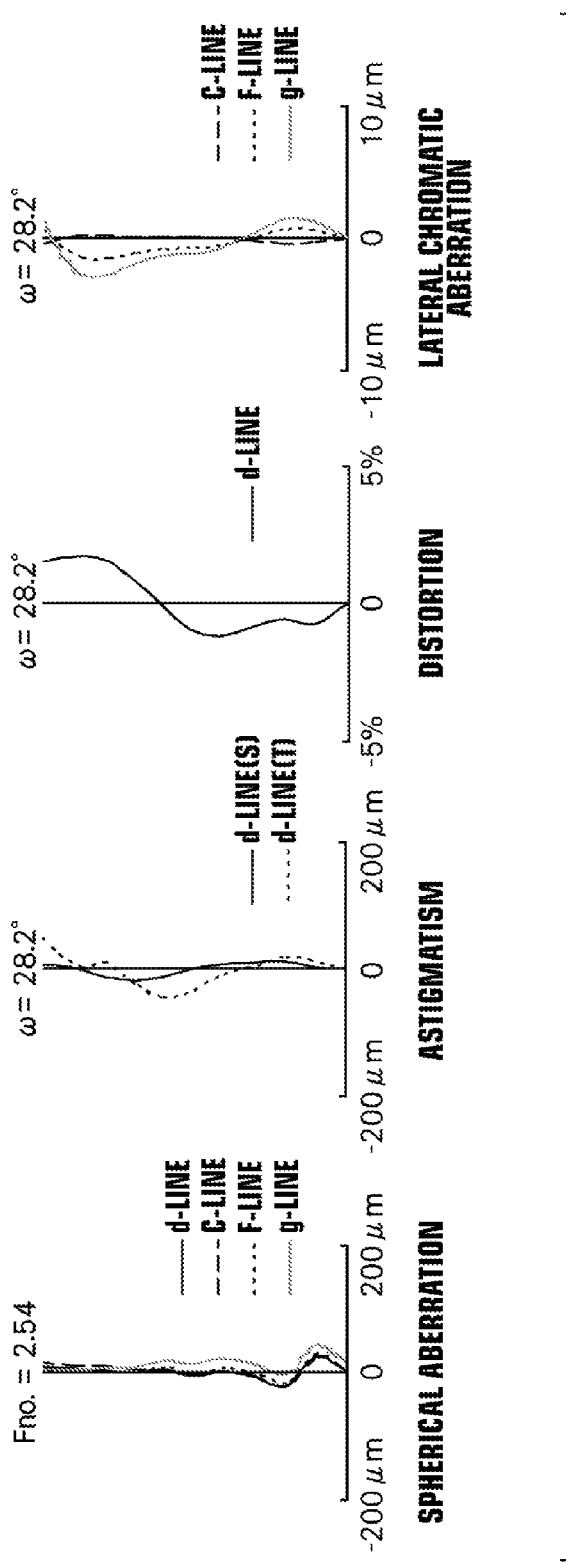
FIG. 17 shows aberration diagrams of the imaging lens according to Example 8 of the present disclosure, in which spherical aberration, astigmatism, distortion, and lateral chromatic aberration are illustrated in order from the left.

FIG. 10 shows aberration diagrams representing spherical aberration, astigmatism, distortion, and lateral chromatic aberration of Example 1 in order from the left. Each aberration diagram of spherical aberration, astigmatism (field curvature), and distortion illustrates aberration with the d-line (wavelength 587.6 nm) as the reference wavelength, but the spherical aberration diagram also illustrates aberrations with respect to the F-line (wavelength 486.1 nm), the C-line (wavelength 656.3 nm), and the g-line (wavelength 435.8 nm), while the lateral chromatic aberration diagram illustrates aberrations with respect to the F-line, the C-line, and the g-line. In the astigmatism diagram, the solid line illustrates aberration in the sagittal direction (S) and the broken line illustrates aberration in the tangential direction (T). The Fno. and ω respectively represent the F-number and the maximum half angle of view when an object at infinity is in focus.

Likewise, various types of aberrations of the imaging lenses of Examples 2 to 8 are illustrated in FIG. 11 to FIG. 17. The aberration diagrams shown in FIG. 10 to FIG. 17 are all in the case where the object distance is infinity.

Table 17 summarizes the values of the conditional expressions (1) to (5) according to the present disclosure for each of Examples 1 to 8.

As is known from each numerical data and each aberration diagram, each example, despite a telephoto type imaging lens, realizes high imaging performance while realizing an overall lens length reduction.

It should be understood that the imaging lens of the present disclosure is not limited to the embodiments and each example described above, and various changes and modifications may be made. For example, values of radius of curvature, surface distance, refractive index, Abbe number, and aspherical surface coefficient of each lens component are not limited to those shown in each numerical example and may take other values.

Each example is described on the assumption that the imaging lens is used in fixed focus, but it is possible to take a configuration that allows focus adjustment. For example, it is possible to take a configuration that allows auto-focusing by, for example, paying out the entire lens system or moving some of the lenses on the optical axis.

Example 1

TABLE 1

Example 1
f = 5.670, Bf = 0.748, Fno. = 2.54, 2ω = 56.6, TTL/f = 1.04

| Si | Ri | Di | Ndj | vdj |
|---|---|---|---|---|
| *1 | 1.72555 | 0.583 | 1.54436 | 56.08 |
| *2 | 33.08224 | 0.085 | | |
| 3(St) | ∞ | 0.282 | | |
| *4 | 43.48205 | 0.600 | 1.63351 | 23.63 |
| *5 | 2.62703 | 0.287 | | |
| *6 | 3.89657 | 0.400 | 1.54436 | 56.08 |
| *7 | 5.07669 | 0.760 | | |
| *8 | −5.19208 | 0.543 | 1.54436 | 56.08 |
| *9 | −1.65663 | 0.150 | | |
| *10 | −5.27380 | 0.592 | 1.63351 | 23.63 |
| *11 | 22.29123 | 0.250 | | |
| *12 | −2.84195 | 0.550 | 1.54436 | 56.08 |
| *13 | −27.24976 | 0.211 | | |
| 14 | ∞ | 0.210 | 1.51633 | 64.14 |
| 15 | ∞ | 0.398 | | |
| 16(IMG) | ∞ | | | |

*Aspherical Surface

TABLE 2

Example 1 • Aspherical Surface Data

| Si | KA | A3 | A4 | A5 | A6 |
|---|---|---|---|---|---|
| 1 | 1.7492930E+00 | 0.0000000E+00 | −2.4233299E−01 | 1.7852637E+00 | −4.7493008E+00 |
| 2 | −4.4523794E+00 | 0.0000000E+00 | −1.5243532E−01 | 1.9078595E+00 | −9.7610845E+00 |
| 4 | −3.3532739E+02 | 0.0000000E+00 | −1.8628359E−02 | 2.4357214E−01 | −6.7493521E−01 |
| 5 | −1.9202039E+01 | 0.0000000E+00 | −1.1201031E−01 | 1.4891882E+00 | −3.1905426E+00 |
| 6 | 1.0170549E+01 | 0.0000000E+00 | −2.0782807E−01 | 7.8368808E−01 | −4.0674494E+00 |
| 7 | 1.8174546E+01 | 0.0000000E+00 | −3.0185550E−01 | 1.2812038E+00 | −2.8060835E+00 |
| 8 | −1.6430053E+02 | 0.0000000E+00 | −3.8090411E−01 | 1.3617099E+00 | −3.3792488E+00 |
| 9 | −1.6789934E−01 | 0.0000000E+00 | −2.2997928E−01 | 3.7490340E−01 | −7.4500560E−01 |
| 10 | −3.2013726E+00 | 0.0000000E+00 | −4.6789663E−01 | −5.1300793E−01 | 2.9887104E+00 |
| 11 | −5.6426851E+00 | 0.0000000E+00 | −6.0064687E−01 | 6.2159323E−02 | 4.2615499E−01 |
| 12 | −2.5647410E+01 | 0.0000000E+00 | −1.6603993E−02 | −2.2045772E+00 | 4.2778865E+00 |
| 13 | −3.4503748E+00 | 0.0000000E+00 | −3.2143669E−02 | 1.2025745E−02 | −3.1316278E−02 |

| Si | A7 | A8 | A9 | A10 | A11 |
|---|---|---|---|---|---|
| 1 | −1.6081710E+00 | 3.3826025E+01 | −6.7304357E+01 | 3.9899087E+01 | 2.5014838E+01 |
| 2 | 2.6791631E+01 | −3.9509494E+01 | 2.4521880E+01 | 8.0746485E+01 | −1.8592866E+01 |
| 4 | 8.7504792E−01 | 1.3576503E−01 | −1.5879236E+00 | 2.0216168E+00 | −3.6907394E+00 |
| 5 | 1.1431746E+00 | 2.4887236E+00 | 6.5749059E+00 | −2.2285341E+01 | 1.5552577E+01 |
| 6 | 1.2337167E+01 | −2.0016377E+00 | 1.0295686E+01 | 1.8888707E+01 | −3.1756110E+01 |
| 7 | 8.1826507E−01 | 6.6595499E+00 | −9.6001630E+00 | 7.6487078E+00 | 4.3909280E+00 |
| 8 | 5.2701944E+00 | −4.4431448E+00 | 1.4448560E+00 | 5.7996442E−01 | −1.3285073E+00 |
| 9 | 2.8659149E+00 | −3.4832494E+00 | 6.0687879E−01 | 8.6601899E−01 | 1.1723128E−01 |
| 10 | −2.2153147E+00 | −7.8197338E−01 | 8.3660791E−01 | 3.2703784E−01 | −8.8142484E−02 |
| 11 | 8.0146983E−01 | −1.3160337E+00 | 2.4860254E−01 | 2.2414473E−01 | 2.4856419E−02 |
| 12 | −2.9124473E+00 | 9.1711654E−01 | −6.8141628E−01 | 6.8495977E−01 | −3.1181371E−01 |
| 13 | 1.9275487E−02 | 6.3830833E−02 | −6.2344517E−02 | −2.3884677E−03 | 2.0795873E−02 |

| Si | A12 | A13 | A14 | A15 | A16 |
|---|---|---|---|---|---|
| 1 | −1.7539569E+01 | −5.8395214E+01 | 8.3741638E+01 | −4.5181138E+01 | 8.7233600E+00 |
| 2 | 7.2652258E+00 | −7.1639792E+00 | 1.5087157E+01 | −1.1242039E+01 | 2.7957036E+00 |
| 4 | 6.1677125E+00 | −2.5961763E+00 | −4.6756364E+00 | 5.5496723E+00 | −1.7263794E+00 |
| 5 | 1.5043290E+00 | 6.9139243E+00 | −2.2283810E+01 | 1.5963346E+01 | −3.6184913E+00 |
| 6 | 5.2909604E+00 | 2.4196065E+01 | −2.2605450E+01 | 7.4426502E+00 | −6.6158819E−01 |
| 7 | 5.3135767E+00 | −1.2668535E+01 | 6.9799436E+00 | −4.7898831E−01 | −4.2304755E−01 |
| 8 | 1.3425312E+00 | −3.4768242E−01 | 4.9406495E−01 | 3.9234875E−01 | −8.3009109E−02 |
| 9 | −3.6671191E−01 | −2.4400368E−02 | 2.2598648E−01 | 4.5647969E−02 | −1.5950614E−02 |
| 10 | −1.6158504E−01 | −8.2699896E−02 | 1.3827453E−01 | −4.3907743E−02 | 3.7455243E−03 |
| 11 | −6.0411229E−02 | −1.4539800E−02 | 9.6266261E−03 | 2.6229031E−03 | −1.0861242E−03 |
| 12 | 1.3771532E−01 | −1.1688041E−01 | 6.3315859E−02 | −1.5975915E−02 | 1.5258891E−03 |
| 13 | −6.6294627E−03 | −6.2253510E−04 | 5.9655042E−04 | −7.8261558E−05 | 6.9732154E−07 |

Example 2

TABLE 3

Example 2
f = 5.688, Bf = 0.720, Fno. = 2.51, 2ω = 56.6, TTL/f = 1.05

| Si | Ri | Di | Ndj | vdj |
|---|---|---|---|---|
| *1 | 1.99624 | 0.500 | 1.54436 | 56.08 |
| *2 | −19.56810 | 0.109 | | |
| 3(St) | ∞ | 0.204 | | |
| *4 | 28.56877 | 0.425 | 1.63351 | 23.63 |
| *5 | 2.49994 | 0.275 | | |
| *6 | 4.19845 | 0.700 | 1.54436 | 56.08 |
| *7 | 19.85063 | 0.850 | | |
| *8 | −5.25603 | 0.493 | 1.54436 | 56.08 |

TABLE 3-continued

Example 2
f = 5.688, Bf = 0.720, Fno. = 2.51, 2ω = 56.6, TTL/f = 1.05

| Si | Ri | Di | Ndj | vdj |
|---|---|---|---|---|
| *9 | −2.02731 | 0.283 | | |
| *10 | −3.86115 | 0.515 | 1.63351 | 23.63 |
| *11 | 13.40970 | 0.250 | | |
| *12 | −2.93968 | 0.551 | 1.54436 | 56.08 |
| *13 | −6.76346 | 0.211 | | |
| 14 | ∞ | 0.210 | 1.51633 | 64.14 |
| 15 | ∞ | 0.371 | | |
| 16(IMG) | ∞ | | | |

*Aspherical Surface

TABLE 4

Example 2 • Aspherical Surface Data

| Si | KA | A3 | A4 | A5 | A6 |
|---|---|---|---|---|---|
| 1 | 1.7492930E+00 | 0.0000000E+00 | −2.8604073E−01 | 2.5033282E+00 | −8.7952920E+00 |
| 2 | −4.4523794E+00 | 0.0000000E+00 | −8.6213040E−02 | 6.0652295E−01 | 1.2304279E+00 |
| 4 | −3.3532739E+02 | 0.0000000E+00 | −8.1159561E−02 | 5.1563898E−01 | −5.4821377E−01 |
| 5 | −1.9202039E+01 | 0.0000000E+00 | 1.7670448E−01 | −6.8960943E−01 | 3.2066324E+00 |

TABLE 4-continued

Example 2 • Aspherical Surface Data

|   |              |              |               |               |               |
|---|--------------|--------------|---------------|---------------|---------------|
| 6 | 1.0170549E+01 | 0.0000000E+00 | -2.9406285E-02 | -1.4374934E-02 | -1.4138979E+00 |
| 7 | 1.8174546E+01 | 0.0000000E+00 | -3.7275091E-01 | 2.6514737E+00 | -8.1168034E+00 |
| 8 | -1.6430053E+02 | 0.0000000E+00 | -2.2437277E-01 | 3.4256811E-01 | -5.4024576E-01 |
| 9 | -1.6789934E-01 | 0.0000000E+00 | -1.4741733E-01 | 1.8895989E+00 | -9.8290608E+00 |
| 10 | -3.2013726E+00 | 0.0000000E+00 | 3.6207483E-02 | -24431341E+00 | 3.6202309E+00 |
| 11 | -5.6426851E+01 | 0.0000000E+00 | -5.6197571E-01 | -8.5810451E-01 | 2.3498054E+00 |
| 12 | -2.5647410E+01 | 0.0000000E+00 | 1.0585272E-01 | -2.8494409E+00 | 3.9784436E+00 |
| 13 | -3.4503748E+00 | 0.0000000E+00 | -6.1711225E-02 | 1.5472027E-01 | -2.7640105E-01 |

|   | A7 | A8 | A9 | A10 | A11 |
|---|----|----|----|-----|-----|
| 1 | 1.1404592E+01 | 6.0314011E+00 | -2.3275292E+01 | -1.6920585E+01 | 8.8723175E+01 |
| 2 | -1.8857639E+01 | 6.5425156E+01 | -1.0356380E+02 | 5.2523102E+01 | 7.2394671E+01 |
| 4 | -1.5787234E+00 | 4.1055220E+00 | -2.7431230E-01 | -7.3437971E+00 | 5.2857293E+00 |
| 5 | -1.0253962E+01 | 2.1714556E+01 | -2.8353783E+01 | 1.0283581E+01 | 4.3197468E+01 |
| 6 | 4.7804725E+00 | -3.3365768E+00 | -9.0275716E+00 | 1.8220245E+01 | -6.6183438E+00 |
| 7 | 1.0179282E+01 | 3.0261361E-01 | -8.9962762E+00 | -3.6194190E+00 | 1.2491137E+01 |
| 8 | 5.9728866E-01 | 2.7104618E-01 | -1.0258847E+00 | 3.3635036E-01 | 3.1348581E-01 |
| 9 | 2.1508244E+01 | -2.0270609E+01 | 2.2207438E+00 | 1.1388003E+00 | -6.5584497E+00 |
| 10 | 1.1447692E+00 | -4.2065526E+00 | 7.471151.4E-01 | 1.5840827E+00 | -2.7219812E-01 |
| 11 | -2.5297026E+00 | 3.5463321E+00 | -3.3520507E+00 | 6.7062755E-01 | 7.8796587E-01 |
| 12 | -2.0400756E-01 | -2.5779850E+00 | 1.7512523E+00 | -7.2100932E-01 | 5.0033621E-01 |
| 13 | 2.3713197E-01 | -4.9881446E-03 | -9.6163294E-02 | 3.3598278E-02 | 8.2760455E-03 |

|   | A12 | A13 | A14 | A15 | A16 |
|---|-----|-----|-----|-----|-----|
| 1 | -7.9549353E+01 | -9.6120155E+01 | 5.8110201E+01 | -3.5554545E+01 | 7.2092902E+01 |
| 2 | -1.2881779E+02 | 6.4311738E+01 | 9.2012343E+00 | -1.9424469E+01 | 5.0959333E+00 |
| 4 | 4.6873554E+00 | -7.0459413E+00 | 1.8211306E+00 | 8.3801754E-01 | -3.5474743E-01 |
| 5 | -9.3389865E+01 | 8.0555105E+01 | -2.2623481E+01 | -9.0707700E+00 | 5.3222971E+00 |
| 6 | -6.8541065E+00 | -3.1251390E+00 | 1.8051518E+00 | -1.4353338E+01 | 3.6971781E+00 |
| 7 | 5.0174472E+00 | -1.4449012E+01 | 1.0995724E+00 | 7.7586358E+00 | -2.9428585E+00 |
| 8 | -4.5119739E-02 | -1.2145136E-01 | -5.0804605E-03 | 3.8834037E-02 | -8.9949959E-03 |
| 9 | -5.9331949E+00 | 1.0800179E+01 | -6.9735136E+00 | 2.2019798E+00 | -2.8152459E-01 |
| 10 | -5.2732745E-01 | 2.1052518E-01 | -2.7986585E-02 | 1.8330524E-02 | -5.7892421E-03 |
| 11 | -1.1256164E-01 | -4.4181786E-01 | 2.8653740E-01 | -7.2008680E-02 | 6.4660055E-03 |
| 12 | -2.5910924E-01 | 3.5468412E-02 | 1.6686240E-02 | -6.2353794E-03 | 5.9238682E-04 |
| 13 | -5.0910025E-03 | 5.2935088E-04 | -3.5077184E-04 | 2.0491536E-04 | -2.9662625E-05 |

Example 3

TABLE 5

Example 3
f = 5.708, Bf = 0.772, Fno. = 2.51, 2ω = 56.2, TTL/f = 1.05

| Si | Ri | Di | Ndj | vdj |
|----|-----|-----|-----|-----|
| *1 | 2.01820 | 0.502 | 1.54436 | 56.08 |
| *2 | -16.68527 | 0.087 | | |
| 3(St) | ∞ | 0.149 | | |
| *4 | 28.57951 | 0.600 | 1.63351 | 23.63 |
| *5 | 2.49996 | 0.275 | | |
| *6 | 4.19647 | 0.639 | 1.54436 | 56.08 |
| *7 | 17.60038 | 0.850 | | |
| *8 | -5.53293 | 0.559 | 1.54436 | 56.08 |
| *9 | -2.11065 | 0.217 | | |
| *10 | -4.02254 | 0.447 | 1.63351 | 23.63 |
| *11 | 20.53404 | 0.250 | | |
| *12 | -4.38817 | 0.550 | 1.54436 | 56.08 |
| *13 | 47.63938 | 0.211 | | |
| 14 | ∞ | 0.210 | 1.51633 | 64.14 |
| 15 | ∞ | 0.422 | | |
| 16(IMG) | ∞ | | | |

*Aspherical Surface

TABLE 6

Example 3 • Aspherical Surface Data

| Si | KA | A3 | A4 | A5 | A6 |
|----|----|----|----|----|----|
| 1 | 1.7492930E+00 | 0.0000000E+00 | -3.4743944E-01 | 3.3329882E+00 | -1.3435896E+01 |
| 2 | -4.4523794E+00 | 0.0000000E+00 | -1.3759945E-01 | 1.5241696E+00 | -5.7524873E+00 |
| 4 | -3.3532739E+02 | 0.0000000E+00 | -7.8087586E-02 | 4.7996598E-01 | -6.7411485E-01 |
| 5 | -1.9202039E+01 | 0.0000000E+00 | 1.7929674E-01 | -8.8896310E-01 | 4.6398020E+00 |
| 6 | 1.0170549E+01 | 0.0000000E+00 | -2.3949575E-02 | 7.8971533E-02 | -1.9895100E+00 |
| 7 | 1.8174546E+01 | 0.0000000E+00 | -3.0580047E-01 | 1.3891029E+00 | 1.7459022E+00 |
| 8 | -1.6430053E+02 | 0.0000000E+00 | -2.6239131E-01 | 4.6453623E-01 | -5.8414481E-01 |
| 9 | -1.6789934E-01 | 0.0000000E+00 | 1.6633992E-01 | -2.0603313E+00 | 8.6579422E+00 |
| 10 | -3.2013726E+00 | 0.0000000E+00 | -4.5321169E-02 | -1.9912646E+00 | 1.6795730E+00 |
| 11 | -5.6426851E+00 | 0.0000000E+00 | -6.4165808E-01 | -4.9348875E-01 | 1.2794122E+00 |

TABLE 6-continued

Example 3 • Aspherical Surface Data

| | | | | | |
|---|---|---|---|---|---|
| 12 | −2.5647410E+01 | 0.0000000E+00 | 1.2866622E−01 | −3.3405067E+00 | 5.7876512E+00 |
| 13 | −3.4503748E+00 | 0.0000000E+00 | −1.5724965E−01 | −1.6849220E−02 | 3.8590379E−01 |

| | A7 | A8 | A9 | A10 | A11 |
|---|---|---|---|---|---|
| 1 | 2.4626453E+01 | −1.1791207E+01 | −2.3123131E+01 | 1.8362958E+01 | 4.0892495E+01 |
| 2 | 1.0097016E+01 | −6.7251460E+00 | 5.0113300E+00 | −3.2883575E+01 | 7.1137412E+01 |
| 4 | −1.0136594E+00 | 3.6833191E+00 | −1.6208435E+00 | −4.7441235E+00 | 5.8845580E+00 |
| 5 | −1.4226033E+01 | 2.2632033E+01 | −7.8942572E+00 | −3.6607033E+01 | 6.0727838E+01 |
| 6 | 6.9616536E+00 | −8.2645144E+00 | −3.6553170E+00 | 1.8126904E+01 | −1.1293153E+01 |
| 7 | −3.2615553E+01 | 1.1763072E+02 | −2.2576583E+02 | 2.7759222E+02 | −2.5388367E+02 |
| 8 | 4.0188876E−01 | 3.0107412E−01 | −8.1126554E−01 | 2.6719736E−01 | 3.3966991E−01 |
| 9 | −2.3833649E+01 | 4.1820151E+01 | −3.9259557E+01 | 1.1073750E+01 | 1.1272553E−01 |
| 10 | 6.3123150E+00 | −1.2017334E+01 | 7.6336096E+00 | −1.8618435E+00 | 6.7481534E−01 |
| 11 | −6.1018166E−01 | 2.0892833E+00 | −3.9227422E+00 | 2.6865118E+00 | −6.6074699E−01 |
| 12 | −3.7868590E+00 | 1.7157272E+00 | −1.1133458E+00 | −2.4309354E−02 | 7.4287176E−01 |
| 13 | −6.2829429E−01 | 5.4314218E−01 | −1.0814205E−01 | −2.2448190E−01 | 1.9284006E−01 |

| | A12 | A13 | A14 | A15 | A16 |
|---|---|---|---|---|---|
| 1 | −6.1987606E+01 | 8.4759416E+00 | 3.4651831E+01 | −2.5159165E+01 | 5.4904502E+00 |
| 2 | −5.1825958E+01 | −1.7734544E+01 | 5.1740780E+01 | −3.0716186E+01 | 6.2992769E+00 |
| 4 | −2.2880832E+00 | 3.3949829E+00 | −6.4424766E+00 | 4.5164174E+00 | −1.0824245E+00 |
| 5 | 3.7373286E+00 | −1.2181903E+02 | 1.6281192E+02 | −9.4773984E+01 | 2.1547856E+01 |
| 6 | −7.4735227E+00 | 7.3660188E+00 | 6.0016454E+00 | −8.3941694E+00 | 2.5424132E+00 |
| 7 | 1.9908342E+02 | −1.2887154E+02 | 5.3676889E+01 | −9.3293996E+00 | −3.2739995E−01 |
| 8 | −2.1090934E+00 | 3.5416741E−01 | −6.9063819E−02 | 5.4545880E−02 | −1.1281155E−02 |
| 9 | −1.0012753E+01 | 1.2993026E+00 | 1.4479517E+00 | −6.4422539E−01 | 8.0597529E−02 |
| 10 | −9.7333745E−01 | 7.5436371E−01 | −3.8678259E−01 | 1.2935685E−01 | −1.9149690E−02 |
| 11 | 6.7208319E−03 | −5.8507723E−03 | 1.6019043E−03 | 5.7571440E−03 | −1.4870162E−03 |
| 12 | −3.1654787E−01 | −1.3029552E−01 | 1.3796059E−01 | −4.0136791E−02 | 4.1431500E−03 |
| 13 | −4.6602823E−02 | −1.1060724E−02 | 8.6440770E−03 | −1.8018810E−03 | 1.3192417E−04 |

Example 4

TABLE 7

Example 4
f = 5.674, Bf = 0.757, Fno. = 2.54, 2ω = 56.6, TTL/f = 1.04

| Si | Ri | Di | Ndj | vdj |
|---|---|---|---|---|
| *1 | 1.73591 | 0.593 | 1.54436 | 56.08 |
| *2 | 200.09541 | 0.085 | | |
| 3(St) | ∞ | 0.251 | | |
| *4 | 52.60517 | 0.600 | 1.63351 | 23.63 |
| *5 | 2.52776 | 0.325 | | |
| *6 | 3.96132 | 0.400 | 1.54436 | 56.08 |
| *7 | 5.18896 | 0.733 | | |
| *8 | −4.64001 | 0.526 | 1.54436 | 56.08 |

TABLE 7-continued

Example 4
f = 5.674, Bf = 0.757, Fno. = 2.54, 2ω = 56.6, TTL/f = 1.04

| Si | Ri | Di | Ndj | vdj |
|---|---|---|---|---|
| *9 | −1.74336 | 0.150 | | |
| *10 | −5.05699 | 0.611 | 1.63351 | 23.63 |
| *11 | −20.00172 | 0.250 | | |
| *12 | −3.08200 | 0.550 | 1.54436 | 56.08 |
| *13 | 20.00396 | 0.211 | | |
| 14 | ∞ | 0.210 | 1.51633 | 64.14 |
| 15 | ∞ | 0.408 | | |
| 16(IMG) | ∞ | | | |

*Aspherical Surface

TABLE 8

Example 4 • Aspherical Surface Data

| Si | KA | A3 | A4 | A5 | A6 |
|---|---|---|---|---|---|
| 1 | 1.7492930E+00 | 0.0000000E+00 | −3.3206651E−01 | 3.1323089E+00 | −1.2690898E+01 |
| 2 | −4.4523794E+00 | 0.0000000E+00 | −1.1159435E−01 | 1.2635181E+00 | −4.9848209E+00 |
| 4 | −3.5532739E+02 | 0.0000000E+00 | −2.1482079E−02 | 3.3163242E−01 | −7.8891360E−01 |
| 5 | −1.9202039E+01 | 0.0000000E+00 | −9.7983334E−02 | 1.6126001E+00 | −3.1293244E+00 |
| 6 | 1.0170549E+01 | 0.0000000E+00 | −1.7490659E−01 | 3.8430470E−01 | −8.4059165E−01 |
| 7 | 1.8174546E+01 | 0.0000000E+00 | −2.6643597E−01 | 1.1057896E+00 | −2.6905129E+00 |
| 8 | −1.6430053E+02 | 0.0000000E+00 | −4.5842653E−01 | 1.5333576E+00 | −4.4387880E+00 |
| 9 | −1.6789934E−01 | 0.0000000E+00 | −2.7331954E−01 | 3.9277654E−01 | −7.5936059E−01 |
| 10 | −3.2013726E+00 | 0.0000000E+00 | −2.5706378E−01 | −2.1350151E+00 | 9.2290941E+00 |
| 11 | −5.6426851E+00 | 0.0000000E+00 | −5.3745867E−01 | 5.2901231E−01 | −1.9953856E+00 |
| 12 | −2.5647410E+01 | 0.0000000E+00 | −3.5538181E−02 | −2.0394213E+00 | 3.6985536E+00 |
| 13 | −3.4503748E+00 | 0.0000000E+00 | −8.8490175E−02 | 3.2080153E−02 | −3.9385276E−02 |

TABLE 8-continued

Example 4 • Aspherical Surface Data

| | A7 | A8 | A9 | A10 | A11 |
|---|---|---|---|---|---|
| 1 | 2.2312853E+01 | −3.0449972E+00 | −4.9403918E+01 | 6.5967063E+01 | −5.8862613E+00 |
| 2 | 7.9883270E+00 | 3.6180483E+00 | −3.2360518E+01 | 4.2738434E+01 | −1.1686811E+01 |
| 4 | 3.1270023E−01 | 2.0023660E+00 | −2.4112897E+00 | −2.5670558E+00 | 4.4326767E+00 |
| 5 | −2.0404392E+00 | 1.3575952E+01 | −8.8358313E+00 | −1.7869105E+01 | 2.4967825E+01 |
| 6 | −1.1769229E+00 | 1.1212993E+01 | −2.4572278E+00 | 1.7417773E+01 | 1.7024743E+01 |
| 7 | 2.5084566E+00 | 1.1401651E+00 | −3.4034981E+00 | 8.8115917E−01 | −8.0347624E−01 |
| 8 | 1.0454198E+01 | −1.8849123E+01 | 2.6536291E+01 | −2.7793092E+01 | 1.8637831E+01 |
| 9 | 2.9551738E+00 | −3.4038567E+00 | −8.5216871E−02 | 1.9674201E+00 | −5.9503996E−01 |
| 10 | −1.5069115E+01 | 1.3186136E+01 | −5.1105010E+00 | −1.9533389E+00 | 2.0470126E+00 |
| 11 | 6.3336448E+00 | −8.6289839E+00 | 5.7977395E+00 | −1.5883675E+00 | −5.3719468E−01 |
| 12 | −1.7715772E+00 | −4.0756023E−01 | 2.3316906E−01 | 2.9589869E−01 | −1.3229038E−01 |
| 13 | 5.8246826E−02 | 4.7268300E−02 | −9.6109195E−02 | 4.0823222E−02 | −6.3419598E−04 |

| | A12 | A13 | A14 | A15 | A16 |
|---|---|---|---|---|---|
| 1 | −4.5457405E+01 | 2.0548136E+01 | 1.9018899E+01 | −1.8729314E+01 | 4.5373706E+00 |
| 2 | −1.3573158E+01 | −5.4192812E+00 | 2.7933937E+01 | −2.0041501E+01 | 4.6628400E+00 |
| 4 | 3.2077168E+00 | −7.31.73771E+00 | 9.9152800E−01 | 3.2989121E+00 | −1.4435667E+00 |
| 5 | −5.8637420E−01 | −8.5856088E+00 | −5.5598037E+00 | 9.6199452E+00 | −2.9240467E+00 |
| 6 | −3.5164891E+01 | 8.3491904E+00 | 2.1492566E+01 | −1.8757111E+01 | 4.7343183E+00 |
| 7 | 6.1857305E+00 | −7.3625666E+00 | 2.2280474E+00 | 9.0608208E−01 | −4.9005600E−01 |
| 8 | −5.6718373E+00 | −9.9874632E−01 | 1.2193960E+00 | −2.5459409E−01 | 2.4698497E−03 |
| 9 | −3.5149158E−01 | 2.6110328E−01 | −1.7517056E−01 | 1.0579471E−01 | −2.3239129E−02 |
| 10 | 2.0791380E+00 | −3.6930274E+00 | 2.1353492E+00 | −5.6974244E−01 | 5.9201039E−02 |
| 11 | 7.2066662E−01 | −2.9124350E−01 | 2.8946210E−02 | 1.3384441E−02 | −3.1091797E−03 |
| 12 | −2.8175834E−02 | 7.2465604E−03 | 1.0808333E−02 | −4.3831191E−03 | 4.7282375E−04 |
| 13 | −2.6174018E−03 | 2.6736640E−04 | −7.0200557E−05 | 6.6382406E−05 | −1.0908942E−05 |

Example 5

TABLE 9

Example 5
f = 5.669, Bf = 0.641, Fno. = 2.54, 2ω = 56.4, TTL/f = 1.04

| Si | Ri | Di | Ndj | vdj |
|---|---|---|---|---|
| *1 | 1.66211 | 0.628 | 1.54436 | 56.08 |
| *2 | 199.60595 | 0.085 | | |
| 3(St) | ∞ | 0.012 | | |
| *4 | 42.36986 | 0.599 | 1.63351 | 23.63 |
| *5 | 2.84055 | 0.301 | | |
| *6 | 5.02491 | 0.400 | 1.54436 | 56.08 |
| *7 | 4.54564 | 0.850 | | |
| *8 | −5.93476 | 0.579 | 1.54436 | 56.08 |
| *9 | −1.83881 | 0.299 | | |
| *10 | −3.97745 | 0.517 | 1.63351 | 23.63 |
| *11 | −30.51833 | 0.322 | | |
| *12 | −2.87095 | 0.597 | 1.54436 | 56.08 |
| *13 | −41.55304 | 0.211 | | |
| 14 | ∞ | 0.210 | 1.51633 | 64.14 |
| 15 | ∞ | 0.291 | | |
| 16(IMG) | ∞ | | | |

*Aspherical Surface

TABLE 10

Example 5 • Aspherical Surface Data

| Si | KA | A3 | A4 | A5 | A6 |
|---|---|---|---|---|---|
| 1 | 1.7492930E+00 | 0.0000000E+00 | −4.1864213E−01 | 4.5016251E+00 | −2.0356642E+01 |
| 2 | −4.4523794E+00 | 0.0000000E+00 | −2.3598774E+00 | 1.3158627E+00 | −3.0261827E+00 |
| 4 | −3.3532739E+02 | 0.0000000E+00 | −1.4185394E−01 | 2.6693438E−01 | 1.9543501E−01 |
| 5 | −1.9202039E+01 | 0.0000000E+00 | 7.3474513E−02 | 1.8856698E−01 | −2.6478068E+00 |
| 6 | 1.0170549E+01 | 0.0000000E+00 | −9.1135135E−02 | −2.4254991E−01 | −1.4274673E+00 |
| 7 | 1.8174546E+00 | 0.0000000E+00 | −3.8155529E−01 | 1.8082524E+00 | −5.3411505E+00 |
| 8 | −1.6430053E+02 | 0.0000000E+00 | −2.7885411E−01 | 7.8353884E−01 | −1.9181046E+00 |
| 9 | −1.6789934E−01 | 0.0000000E+00 | −6.1203502E−02 | 6.4708066E−02 | −1.0553489E+00 |
| 10 | −3.2013726E+00 | 0.0000000E+00 | −2.3624341E−01 | −7.5550810E−01 | 2.4084993E+00 |
| 11 | −5.6426851E+00 | 0.0000000E+00 | −5.7690182E−01 | 1.2969039E−01 | 5.0827516E−01 |
| 12 | −2.5647410E+01 | 0.0000000E+00 | −2.3463822E−01 | −1.9290670E−01 | 3.4319417E+00 |
| 13 | −3.4503748E+00 | 0.0000000E+00 | −2.1981957E−01 | 9.7535057E−02 | −3.3150913E−03 |

| | A7 | A8 | A9 | A10 | A11 |
|---|---|---|---|---|---|
| 1 | 4.2294294E+01 | −2.1066410E+00 | −8.5334427E+01 | 2.0052381E+02 | −1.9928498E+02 |
| 2 | −1.7423546E+00 | 2.8530902E+01 | −7.2264710E+01 | 8.5640704E+01 | −4.4242092E+01 |
| 4 | −1.5876146E+00 | 2.4347392E+00 | 4.7755302E−02 | −3.5869500E+00 | 3.3191033E+00 |
| 5 | 7.4182310E+00 | −4.3821018E+00 | −8.2642265E+00 | 1.6071843E+00 | 2.5903614E+01 |

TABLE 10-continued

Example 5 • Aspherical Surface Data

|    | A7            | A8            | A9            | A10           | A11           |
|----|---------------|---------------|---------------|---------------|---------------|
| 6  | 9.3740115E+00 | −1.8858368E+01 | 1.1225580E+01 | 1.1812409E+01 | −1.3666321E+01 |
| 7  | 8.2099167E+00 | −5.3818427E+00 | −1.9925948E−01 | 4.4268335E−01 | 1.3228634E+00 |
| 8  | 2.1269633E+00 | 8.5916807E−01 | −3.7118752E+00 | 1.5612020E+00 | 1.6446859E+00 |
| 9  | 3.5466308E+00 | −3.9367881E+00 | 1.1549262E+00 | 1.3593845E−01 | 7.3608961E−01 |
| 10 | −8.4555757E−01 | −1.8849783E+00 | 1.2045772E+00 | 4.1294663E−01 | −2.2620558E−01 |
| 11 | 2.7519472E−01 | −4.1764835E−01 | −7.1463251E−01 | 9.6361425E−01 | −3.4806377E−01 |
| 12 | −8.2579961E−01 | −1.6818332E+00 | 1.1435261E+00 | −5.6843403E−02 | −9.9602006E−02 |
| 13 | 8.6386593E−02 | −4.8317879E−02 | −1.8392046E−02 | 8.7613959E−03 | 5.4935578E−03 |

|    | A12           | A13           | A14           | A15           | A16           |
|----|---------------|---------------|---------------|---------------|---------------|
| 1  | 1.0513898E+02 | −3.7813117E+01 | 2.1235594E+01 | −1.2351106E+01 | 2.8985014E+00 |
| 2  | 5.3060225E+00 | −1.5243158E+01 | 3.3022918E+01 | −2.2126247E+01 | 5.0807951E+00 |
| 4  | −2.3019653E+00 | 4.3378704E+00 | −5.0220524E+00 | 2.4536731E+00 | −4.1027478E−01 |
| 5  | −2.4013835E+01 | 3.5818729E+00 | −1.4545694E+01 | 2.5767946E+01 | −1.0548910E+01 |
| 6  | −8.2887805E+00 | 1.0948976E+01 | 6.1454150E+00 | −9.7909554E+00 | 2.8007195E+00 |
| 7  | −7.1319395E−01 | 6.7044765E+00 | −1.6097626E+01 | 1.3399371E+01 | −3.8480970E+00 |
| 8  | −1.0361349E+00 | −4.1427891E−01 | 2.4808607E−01 | 1.0322186E−01 | −5.0903458E−02 |
| 9  | −8.1415376E−01 | 2.6712343E−01 | −1.1086767E−01 | 8.0640341E−02 | −1.9925022E−02 |
| 10 | −2.1953298E−01 | 9.4990549E−02 | 1.9690263E−02 | −9.4224517E−03 | −8.0034212E−05 |
| 11 | 2.7733026E−02 | −6.5089920E−04 | −5.4528273E−03 | 6.4265341E−03 | −1.4347412E−03 |
| 12 | 1.4447080E−03 | 7.3629897E−04 | 6.7123905E−03 | −2.3886688E−03 | 2.2055662E−04 |
| 13 | −2.0517481E−03 | −4.9220329E−04 | 1.9082588E−04 | 1.8763437E−05 | −7.2617655E−06 |

Example 6

TABLE 11

Example 6
f = 5.667, Bf = 0.742, Fno. = 2.55, 2ω = 56.4, TTL/f = 1.04

| Si     | Ri        | Di    | Ndj     | vdj   |
|--------|-----------|-------|---------|-------|
| *1     | 1.66089   | 0.625 | 1.54436 | 56.08 |
| *2     | 1866.77910 | 0.085 |         |       |
| 3(St)  | ∞         | 0.046 |         |       |
| *4     | 52.65864  | 0.600 | 1.63351 | 23.63 |
| *5     | 2.76629   | 0.275 |         |       |
| *6     | 5.02501   | 0.400 | 1.54436 | 56.08 |
| *7     | 4.52507   | 0.850 |         |       |
| *8     | −5.99366  | 0.590 | 1.54436 | 56.08 |

TABLE 11-continued

Example 6
f = 5.667, Bf = 0.742, Fno. = 2.55, 2ω = 56.4, TTL/f = 1.04

| Si      | Ri        | Di    | Ndj     | vdj   |
|---------|-----------|-------|---------|-------|
| *9      | −1.71876  | 0.266 |         |       |
| *10     | −4.79366  | 0.520 | 1.63351 | 23.63 |
| *11     | 15.25412  | 0.251 |         |       |
| *12     | −2.80800  | 0.583 | 1.54436 | 56.08 |
| *13     | −9.97641  | 0.211 |         |       |
| 14      | ∞         | 0.210 | 1.51633 | 64.14 |
| 15      | ∞         | 0.393 |         |       |
| 16(IMG) | ∞         |       |         |       |

*Aspherical Surface

TABLE 12

Example 6 • Aspherical Surface Data

| Si | KA            | A3            | A4            | A5            | A6            |
|----|---------------|---------------|---------------|---------------|---------------|
| 1  | 1.7492930E+00 | 0.0000000E+00 | −3.2777693E−01 | 3.3307700E+00 | −1.4487610E+01 |
| 2  | −4.4523794E+00 | 0.0000000E+00 | −3.4401602E−01 | 3.6903564E+00 | −1.9904609E+01 |
| 4  | −3.3532739E+02 | 0.0000000E+00 | −1.0582467E−01 | 2.2548560E−01 | 1.6066501E−01 |
| 5  | −1.9202039E+00 | 0.0000000E+00 | 8.1375138E−02 | 7.5116875E−01 | −8.9586433E+00 |
| 6  | 1.0170549E+01 | 0.0000000E+00 | −1.0798422E−01 | −2.7096685E+00 | −5.8664216E−01 |
| 7  | 1.8174546E+01 | 0.0000000E+00 | −3.9832084E−01 | 1.7308101E+00 | −4.3222040E+00 |
| 8  | −1.6430053E+02 | 0.0000000E+00 | −2.7680891E−01 | 9.3918964E−01 | −2.8730839E+00 |
| 9  | −1.6789934E+00 | 0.0000000E+00 | −1.1126496E−01 | 2.1676287E−01 | −1.6154412E+00 |
| 10 | −3.2013726E+00 | 0.0000000E+00 | −3.6472940E−01 | −6.5921877E−01 | 2.6579579E+00 |
| 11 | −5.6426851E+00 | 0.0000000E+00 | −6.8537285E−01 | 1.4844801E−01 | 4.8718473E−01 |
| 12 | −2.5647410E+01 | 0.0000000E+00 | −1.9119717E−01 | −1.9995672E+00 | 3.6413747E+00 |
| 13 | −3.4503748E+00 | 0.0000000E+00 | −1.3357429E−01 | 8.6499321E−02 | −1.6487384E−02 |

|    | A7            | A8            | A9            | A10           | A11           |
|----|---------------|---------------|---------------|---------------|---------------|
| 1  | 2.9478658E+01 | −2.0590948E+01 | −2.1362401E+01 | 4.0247058E+01 | −3.8948357E+00 |
| 2  | 6.0707502E+01 | −1.0344880E+02 | 7.9178067E+01 | 2.5390542E+01 | −9.1070268E+01 |
| 4  | −1.6662658E+00 | 3.2171721E+00 | −1.1788525E+00 | −3.4722447E+00 | 3.9352677E+00 |
| 5  | 4.1141714E+01 | −1.1012778E+02 | 1.9526476E+02 | −2.2058701E+02 | 8.9120697E+01 |
| 6  | 5.0739266E+00 | −8.1383436E+00 | −1.8550421E+00 | 1.4027725E+01 | −1.0966577E+01 |
| 7  | 4.2969061E+00 | 1.9697273E+00 | −5.9976598E+00 | −2.2006107E+00 | 9.1107322E+00 |
| 8  | 4.8376935E+00 | −3.1966009E+00 | −8.6141138E−01 | 1.9373701E+00 | −6.4423077E−01 |
| 9  | 5.6354768E+00 | −8.6003615E+00 | 7.5602629E+00 | −5.0610634E+00 | 2.3804786E+00 |
| 10 | −1.3580734E+00 | −1.3723089E+00 | 7.4273635E−01 | 7.7580389E−01 | −3.9543925E−01 |
| 11 | 6.6732056E−01 | −1.2069954E+00 | 1.7774759E−01 | 2.6572743E−01 | 6.1528506E−03 |

TABLE 12-continued

Example 6 • Aspherical Surface Data

| | | | | | |
|---|---|---|---|---|---|
| 12 | −1.3198112E+00 | −9.7689689E−01 | 5.1780198E−01 | 2.6318409E−01 | −1.5029431E−01 |
| 13 | 1.2159568E−02 | 5.5833912E−02 | −8.3869275E−02 | 3.7141611E−02 | −4.3855914E−03 |

| | A12 | A13 | A14 | A15 | A16 |
|---|---|---|---|---|---|
| 1 | −1.7143138E+01 | −1.7663133E+01 | 4.3531178E+01 | −2.6748494E+01 | 5.5957936E+00 |
| 2 | 2.9551008E+01 | 6.3929108E+01 | −7.4730596E+01 | 3.2203536E+01 | −5.1336842E+00 |
| 4 | −6.8584382E−01 | 2.8284276E−01 | −1.7394286E+00 | 1.3124740E+00 | −2.7470453E−01 |
| 5 | 1.6345111E+02 | −3.0269305E+02 | 2.0580246E+02 | −5.4130121E+01 | 1.0368603E+00 |
| 6 | −1.5611491E+01 | −3.3334477E+00 | 2.7725347E+01 | −2.0331231E+01 | 4.4513008E+00 |
| 7 | 3.5459235E−02 | −7.9850529E+00 | 1.3092864E+00 | 4.3970455E+00 | −2.0262626E+00 |
| 8 | 3.3270120E−01 | −1.8470867E−01 | −3.6165863E−01 | 3.6558029E−01 | −8.9161435E−02 |
| 9 | 3.4127820E−01 | −1.3243387E+00 | 6.9838182E−01 | −1.2537822E−01 | 1.8979327E−03 |
| 10 | −2.0238045E−01 | 1.1623658E−01 | 1.0175524E−02 | −8.2590980E−03 | −4.6591735E−05 |
| 11 | −5.7978649E−02 | −1.1853329E−02 | 8.2625541E−03 | −1.0913728E−03 | |
| 12 | −4.5372989E−02 | 3.7647525E−02 | −5.6871969E−03 | −2.4882787E−04 | 6.6017721E−05 |
| 13 | 4.0962173E−04 | −8.7108427E−04 | 2.4304751E−04 | 7.5748729E−06 | −6.0009977E−06 |

Example 7

TABLE 13

Example 7
f = 5.667, Bf = 0.619, Fno. = 2.54, 2ω = 56.4, TTL/f = 1.04

| Si | Ri | Di | Ndj | vdj |
|---|---|---|---|---|
| *1 | 1.65780 | 0.628 | 1.54436 | 56.08 |
| *2 | 155.52442 | 0.085 | | |
| 3(St) | ∞ | 0.014 | | |
| *4 | 40.01530 | 0.600 | 1.63351 | 23.63 |
| *5 | 2.85735 | 0.307 | | |
| *6 | 5.02488 | 0.400 | 1.54436 | 56.08 |
| *7 | 4.54566 | 0.850 | | |
| *8 | −5.87099 | 0.568 | 1.54436 | 56.08 |

TABLE 13-continued

Example 7
f = 5.667, Bf = 0.619, Fno. = 2.54, 2ω = 56.4, TTL/f = 1.04

| Si | Ri | Di | Ndj | vdj |
|---|---|---|---|---|
| *9 | −1.85206 | 0.301 | | |
| *10 | −4.31100 | 0.509 | 1.63351 | 23.63 |
| *11 | 30.94577 | 0.308 | | |
| *12 | −3.81976 | 0.602 | 1.54436 | 56.08 |
| *13 | 33.33333 | 0.211 | | |
| 14 | ∞ | 0210 | 1.51633 | 64.14 |
| 15 | ∞ | 0.269 | | |
| 16(IMG) | ∞ | | | |

*Aspherical Surface

TABLE 14

Example 7 • Aspherical Surface Data

| Si | KA | A3 | A4 | A5 | A6 |
|---|---|---|---|---|---|
| 1 | 1.7492930E+00 | 0.0000000E+00 | −3.8654805E−01 | 4.0917389E+00 | −1.8854892E+01 |
| 2 | −4.4523794E+00 | 0.0000000E+00 | −2.9215153E−01 | 2.2418809E+00 | −9.4534091E+00 |
| 4 | −3.3532739E+02 | 0.0000000E+00 | −1.4326610E−01 | 2.7099475E−01 | 1.4673338E−01 |
| 5 | −1.9202039E+01 | 0.0000000E+00 | 5.7226712E−02 | 4.3477471E−01 | −4.4771300E+00 |
| 6 | 1.0170549E+01 | 0.0000000E+00 | −1.4559508E−01 | 7.6218728E−01 | −8.4011765E+00 |
| 7 | 1.8174546E+01 | 0.0000000E+00 | −3.8090531E−01 | 1.8203602E+00 | −5.4643544E+00 |
| 8 | −1.6430053E+02 | 0.0000000E+00 | −2.9032975E−01 | 9.9579940E−01 | −3.0447340E+00 |
| 9 | −1.6789934E+00 | 0.0000000E+00 | −5.7215096E−02 | 2.8753966E−01 | −2.3433346E+00 |
| 10 | −3.2013726E+00 | 0.0000000E+00 | −2.0108644E−01 | −8.4457241E−01 | 2.3892124E+00 |
| 11 | −5.6426851E+00 | 0.0000000E+00 | −6.2195729E−01 | 7.7588803E−02 | 8.2365756E−01 |
| 12 | −2.5647410E+01 | 0.0000000E+00 | −2.4960087E−01 | −1.9108504E+00 | 3.3808799E+00 |
| 13 | −3.4503748E+00 | 0.0000000E+00 | −3.0076606E−01 | 2.8403210E−01 | −4.0713977E−01 |

| | A7 | A8 | A9 | A10 | A11 |
|---|---|---|---|---|---|
| 1 | 4.3405103E+01 | −4.6183030E+01 | 3.1114337E+00 | 3.5375918E+01 | −1.3951808E+01 |
| 2 | 2.2555436E+01 | −2.5722725E+01 | −1.3361221E+00 | 3.7869472E+01 | −3.9991418E+01 |
| 4 | −1.3293333E+00 | 1.6265138E+00 | 1.4351881E+00 | −4.3647909E+00 | 1.7889166E+00 |
| 5 | 1.4532905E+01 | −1.9042943E+01 | 3.9763370E+00 | 7.4284611E+00 | 2.2586420E+01 |
| 6 | 3.3297048E+01 | −5.4772578E+01 | −7.0974718E+00 | 1.7394681E+02 | −2.5627402E+02 |
| 7 | 8.8192038E+00 | −7.2125796E+00 | 3.3784051E+00 | −4.0649570E+00 | 4.4635657E+00 |
| 8 | 5.1585941E+00 | −3.4572783E+00 | −1.3009678E+00 | 3.2704078E+00 | −1.8530233E+00 |
| 9 | 7.0632016E+00 | −9.6294837E+00 | 6.9298858E+00 | −3.5834680E+00 | 2.4857736E+00 |
| 10 | −5.9047114E−01 | −2.2287943E+00 | 1.5053800E+00 | 1.3014554E−01 | 1.8484426E−02 |
| 11 | −2.6954599E−01 | 1.8445697E−02 | −6.6238031E−01 | 4.7338193E−01 | 1.5380714E−01 |
| 12 | −7.6254639E−01 | −1.6429122E+00 | 1.0045520E+00 | 5.7245111E−03 | 1.1776795E−02 |
| 13 | 7.0793742E−01 | −6.0548201E−01 | 2.3031550E−01 | 4.4751643E−03 | −4.6177382E−02 |

TABLE 14-continued

Example 7 • Aspherical Surface Data

| | A12 | A13 | A14 | A15 | A16 |
|---|---|---|---|---|---|
| 1 | −1.7944337E+01 | 2.0182800E+00 | 2.2855840E+01 | −1.7616516E+01 | 4.0457235E+00 |
| 2 | −4.1609832E+00 | 2.0876874E+01 | −7.6345582E+00 | −2.3260879E+00 | 1.3901564E+00 |
| 4 | 1.3293285E+00 | 8.3668397E−01 | −3.1584965E+00 | 1.9002620E+00 | −3.3469145E−01 |
| 5 | −8.5734704E+01 | 1.4514196E+02 | −1.5600096E+02 | 9.5910930E+01 | −2.4677398E+01 |
| 6 | 7.0603298E+01 | 2.0567784E+02 | −2.6584818E+02 | 1.3431176E+02 | −2.6117188E+01 |
| 7 | −7.8099006E−01 | 4.6640568E+00 | −1.4272562E+01 | 1.2707992E+01 | −3.7509196E+00 |
| 8 | 4.9161870E−01 | 3.6549588E−01 | −8.4321265E−01 | 5.4098393E−01 | −1.1436871E−01 |
| 9 | −1.9062773E+00 | 1.1799903E+00 | −6.3246942E−01 | 2.3789332E−01 | −3.9175548E−02 |
| 10 | −3.7101137E−01 | 1.6308702E−01 | −4.2331046E−02 | −3.5357102E−03 | −7.6667503E−04 |
| 11 | −2.1627620E−01 | 4.8132862E−02 | 2.1957175E−04 | 2.0481692E−03 | −8.5586437E−04 |
| 12 | −1.8061024E−01 | 1.2438392E−01 | −3.9307833E−02 | 6.8113881E−03 | −5.5561696E−04 |
| 13 | 2.0964489E−02 | −2.8446483E−03 | −8.6775162E−04 | 3.6755807E−04 | −3.8863433E−05 |

Example 8

TABLE 15

Example 8
f = 5.666, Bf = 0.656, Fno. = 2.54, 2ω = 56.4, TTL/f = 1.04

| Si | Ri | Di | Ndj | vdj |
|---|---|---|---|---|
| *1 | 1.65908 | 0.630 | 1.54436 | 56.08 |
| *2 | 138.14598 | 0.085 | | |
| 3(St) | ∞ | 0.009 | | |
| *4 | 39.99928 | 0.596 | 1.63351 | 23.63 |
| *5 | 2.85339 | 0.304 | | |
| *6 | 5.02682 | 0.400 | 1.54436 | 56.08 |
| *7 | 4.54566 | 0.850 | | |
| *8 | −5.75032 | 0.576 | 1.54436 | 56.08 |
| *9 | −1.87663 | 0.299 | | |
| *10 | −4.10420 | 0.517 | 1.63351 | 23.63 |
| *11 | −33.34434 | 0.314 | | |
| *12 | −3.54741 | 0.586 | 1.54436 | 56.08 |
| *13 | 23.41627 | 0.211 | | |
| 14 | ∞ | 0.210 | 1.51633 | 64.14 |
| 15 | ∞ | 0.306 | | |
| 16(IMG) | ∞ | | | |

*Aspherical Surface

TABLE 16

Example 8 • Aspherical Surface Data

| Si | KA | A3 | A4 | A5 | A6 |
|---|---|---|---|---|---|
| 1 | 1.7492930E+00 | 0.0000000E+00 | −4.6574365E−01 | 5.3346002E+00 | −2.6713672E+01 |
| 2 | −4.4523794E+00 | 0.0000000E+00 | −2.9735147E−01 | 2.0499259E+00 | −7.8186370E+00 |
| 4 | −3.3532739E+02 | 0.0000000E+00 | −1.5140026E−01 | 9.4585459E−02 | 1.8807836E+00 |
| 5 | −1.9202039E+01 | 0.0000000E+00 | 7.2577038E−02 | 1.6002312E−01 | −2.5050902E+00 |
| 6 | 1.0170549E+01 | 0.0000000E+00 | −5.2726335E−02 | −9.2433865E−01 | 4.2519822E+00 |
| 7 | 1.8174546E+01 | 0.0000000E+00 | −2.1454983E−01 | −9.3318500E−01 | 1.3236164E+01 |
| 8 | −1.6430053E+02 | 0.0000000E+00 | −3.2036694E−01 | 1.2888840E+00 | −4.6162035E+00 |
| 9 | −1.6789934E−01 | 0.0000000E+00 | 1.4609814E−03 | −3.8097801E−01 | 8.6298541E−01 |
| 10 | −3.2013726E+00 | 0.0000000E+00 | −1.6696595E−01 | −1.0041607E+00 | 3.0333370E+00 |
| 11 | −5.6426851E+00 | 0.0000000E+00 | −5.9335645E−01 | 1.72281.51E−01 | 4.1229564E−01 |
| 12 | −2.5647410E+01 | 0.0000000E+00 | −2.3017980E−01 | −1.9706568E+00 | 3.6127288E+00 |
| 13 | −3.4503748E+00 | 0.0000000E+00 | −2.6106931E−01 | 1.3145473E−01 | −1.6903938E−02 |

| | A7 | A8 | A9 | A10 | A11 |
|---|---|---|---|---|---|
| 1 | 6.9188193E+01 | −8.9311530E+01 | 1.7125455E+01 | 1.2813789E+02 | −2.2904682E+02 |
| 2 | 1.6640383E+01 | −1.4563506E+01 | −1.0328904E+01 | 3.2753439E+01 | −1.5642353E+01 |
| 4 | −8.3550689E+00 | 1.7078497E+01 | −1.6593950E+01 | 2.0080680E+00 | 9.8227660E+00 |
| 5 | 7.2419773E+00 | −6.0187423E+00 | 5.5558792E−01 | −1.6190036E+01 | 3.5468461E+01 |
| 6 | −1.7982642E+01 | 6.5233742E+01 | −1.6460205E+02 | 2.7799431E+02 | −3.3016489E+02 |
| 7 | −5.6713659E+01 | 1.1042568E+02 | −5.6783183E+01 | −1.6180761E+02 | 3.0321276E+02 |
| 8 | 9.8719130E+00 | −1.1898870E+01 | 7.5942892E+00 | −1.3028256E+00 | −2.2688741E+00 |
| 9 | −1.4181451E+00 | 3.4961603E+00 | −4.7718396E+01 | 1.5240828E+00 | 2.1186929E+00 |
| 10 | −2.0603048E+00 | −4.9079776E−01 | 5.9401614E−01 | 3.7705863E−02 | 3.0435836E−01 |
| 11 | 5.5572951E−01 | −1.0141985E+00 | 8.9127804E−02 | 2.4201724E−01 | 1.0828031E−01 |
| 12 | −1.2926340E+00 | −9.2707288E−01 | 3.7349057E−01 | 4.1275137E−01 | −2.2509122E−01 |
| 13 | 1.0472112E−01 | −7.0827025E−02 | −1.0609167E−02 | 1.3603748E−02 | 8.5390259E−04 |

| | A12 | A13 | A14 | A15 | A16 |
|---|---|---|---|---|---|
| 1 | 2.2556678E+02 | −1.6188557E+02 | 8.8679885E+01 | −3.1938942E+01 | 5.2969823E+00 |
| 2 | −1.8556029E+01 | 2.0311150E+01 | 2.7866337E−01 | −7.1978827E+00 | 2.3865714E+00 |
| 4 | −2.3259735E+00 | −1.4097170E+01 | 1.8642054E+01 | −1.0183020E+01 | 2.1827419E+00 |
| 5 | 2.6562811E+00 | −5.8077807E+01 | 4.3827609E+01 | −1.9181501E+01 | −5.1357765E+00 |

TABLE 16-continued

Example 8 • Aspherical Surface Data

| 6 | 3.1118796E+02 | −2.6054601E+02 | 1.7815525E+02 | −7.7320414E+01 | 1.4711110E+01 |
| 7 | −9.8238817E+01 | −2.4173059E+02 | 3.1602160E+02 | −1.5503924E+02 | 2.8491124E+01 |
| 8 | 2.4163198E+00 | −5.0364370E−01 | −8.6174964E−01 | 6.5543517E−01 | −1.3859322E−01 |
| 9 | −1.5997805E+00 | −2.0637690E−01 | 4.9683478E−01 | −1.4697509E−01 | 1.0667055E−02 |
| 10 | −3.1442773E−01 | −7.0416684E−02 | 1.4366326E−01 | −4.4936244E−02 | 3.7644704E−03 |
| 11 | −1.8265945E−01 | 7.0381791E−02 | −2.2378803E−02 | 8.9893995E−03 | −1.6201579E−03 |
| 12 | −3.6518067E−02 | 4.7871489E−02 | −1.1637583E−02 | 1.1070811E−03 | −5.2943658E−05 |
| 13 | −1.1902583E−03 | −5.6811869E−05 | −6.8565575E−05 | 7.1378770E−05 | −1.1239614E−05 |

TABLE 17

Values of Conditional Expressions

| Expression No. | Conditional Expression | Example 1 | Example 2 | Example 3 | Example 4 |
|---|---|---|---|---|---|
| 1 | f/f1 | 1.71 | 1.70 | 1.71 | 1.77 |
| 2 | f/f2 | −1.28 | −1.31 | −1.31 | −1.35 |
| 3 | f/f4 | 1.34 | 0.99 | 0.96 | 1.18 |
| 4 | f/f6 | −0.97 | −0.57 | −0.78 | −1.17 |
| 5 | (L4r + L4f)/(L4r − L4f) | −1.94 | −2.26 | −2.23 | −2.20 |

| Expression No. | Conditional Expression | Example 5 | Example 6 | Example 7 | Example 8 |
|---|---|---|---|---|---|
| 1 | f/f1 | 1.84 | 1.86 | 1.84 | 1.84 |
| 2 | f/f2 | −1.17 | −1.22 | −1.16 | −1.16 |
| 3 | f/f4 | 1.22 | 1.34 | 1.20 | 1.17 |
| 4 | f/f6 | −1.00 | −0.77 | −0.91 | −1.01 |
| 5 | (L4r + L4f)/(L4r − L4f) | −1.90 | −1.80 | −1.92 | −1.97 |

The paraxial radius of curvature, surface distance, refractive index, and Abbe number described above were obtained by an optical measurement expert through measurement by the following method.

The paraxial radius of curvature was obtained in the following steps by measuring the lens using an ultra-accuracy 3-D profilometer, UA3P (product of Panasonic Factory Solutions Corporation). A paraxial radius of curvature $R_m$ (in is a natural number) and a cone constant $K_m$ are tentatively set and inputted to the UA3P and an $n^{th}$ order aspherical surface coefficient An of the aspherical surface shape formula is calculated from these and measurement data using an auxiliary fitting function of the UA3P. It is assumed, in the aspherical surface shape formula (A), that $C=1/R_m$ and $KA=K_m-1$. From $R_m$, $K_m$, An, and the aspherical surface shape formula, a depth Z of the aspherical surface in an optical axis direction according to the height h from the optical axis is calculated. A difference between a calculated depth Z and a measured depth Z' is obtained at each height h from the optical axis, then a determination is made whether or not the difference is within a predetermined range, and if the difference is within the predetermined range, the set $R_m$ is taken as the paraxial radius of curvature. On the other hand, if the difference is outside of the predetermined range, at least one of the values of $R_m$ and $K_m$ used in the calculation of the difference is set to $R_{m+1}$ and $K_{m+1}$ and inputted to the UA3P, then processing identical to that described above is performed, and determination processing whether or not a difference between a calculated depth Z and a measured depth Z' at each height h from the optical axis is within the predetermined range is repeated until the difference between the calculated depth Z and the measured depth Z' at each height h from the optical axis remains within the predetermined range. The term, within a predetermined range, as used herein refers to within 200 nm. The range of h is a range corresponding to 0 to ⅕ of the maximum outer diameter.

The surface distance was obtained by performing measurement using a thickness and distance measuring device for coupling lenses, OptiSurf (product of Trioptics).

The refractive index was obtained by measuring a test object with the temperature of the test object being maintained at 25° C. using a precision refractometer, KPR-2000 (product of Shimadzu Corporation). The refractive index measured at the d-line (wavelength 587.6 nm) is taken as Nd. Likewise, the refractive indices measured at the e-line (wavelength 546.1 nm), the F-line (wavelength 486.1 nm), the C-line (wavelength 656.3 nm) and the g-line (wavelength 435.8 nm) are taken as Ne, NF, NC, and Ng respectively. The Abbe number vd with respect to the d-line was obtained by substituting the Nd, NF, and NC obtained by the aforementioned measurements in a formula, vd=(Nd−1)/(NF−NC).

What is claimed is:

1. An imaging lens, consisting of six lenses, composed of, in order from the object side:
   a first lens having a positive refractive power with a convex surface on the object side;
   a second lens having a negative refractive power;
   a third lens having a convex surface on the object side;
   a fourth lens having a positive refractive power;
   a fifth lens having a negative refractive power; and
   a sixth lens having a negative refractive power, wherein the following conditional expressions are satisfied:

$$1.65 < f/f1 < 2 \tag{1}$$

$$-1.65 < f/f2 < -0.8 \tag{2}$$

$$0.5 < f/f4 < 1.7 \tag{3}$$

where:
   f is the focal length of the entire system;
   f1 is the focal length of the first lens;
   f2 is the focal length of the second lens; and
   f4 is the focal length of the fourth lens.

2. The imaging lens of claim 1, wherein the second lens has a meniscus shape with a convex surface on the object side.

3. The imaging lens of claim 1, wherein the third lens has a meniscus shape with a convex surface on the object side.

4. The imaging lens of claim 1, wherein the fourth lens has a meniscus shape with a concave surface on the object side.

5. The imaging lens of claim 1, wherein the fifth lens has a concave surface on the object side.

6. The imaging lens of claim 1, further comprising an aperture stop located on the object side of the object side surface of the second lens.

7. The imaging lens of claim 1, wherein the following conditional expression is further satisfied:

$$-1.5 < f/f6 < -0.3 \qquad (4)$$

where f6 is the focal length of the sixth lens.

8. The imaging lens of claim 1, wherein the following conditional expression is further satisfied:

$$-5 < (L4r+L4f)/(L4r-L4f) < -1.5 \qquad (5)$$

where:
L4r is the paraxial radius of curvature of the image side surface of the fourth lens; and
L4f is the paraxial radius of curvature of the object side surface of the fourth lens.

9. The imaging lens of claim 1, wherein the following conditional expression is further satisfied:

$$-1.6 < f/f2 < -0.9 \qquad (2\text{-}1)$$

10. The imaging lens of claim 9, wherein the following conditional expression is further satisfied:

$$-1.5 < f/f2 < -1 \qquad (2\text{-}2)$$

11. The imaging lens of claim 1, wherein the following conditional expression is further satisfied:

$$0.7 < f/f4 < 1.6 \qquad (3\text{-}1)$$

12. The imaging lens of claim 11, wherein the following conditional expression is further satisfied:

$$0.8 < f/f4 < 1.5 \qquad (3\text{-}2)$$

13. The imaging lens of claim 7, wherein the following conditional expression is further satisfied:

$$-1.3 < f/f6 < -0.4 \qquad (4\text{-}1)$$

where f6 is the focal length of the sixth lens.

14. The imaging lens of claim 13, wherein the following conditional expression is further satisfied:

$$-1.2 < f/f6 < -0.5 \qquad (4\text{-}2)$$

15. The imaging lens of claim 8, wherein the following conditional expression is further satisfied:

$$-3.5 < (L4r+L4f)/(L4r-L4f) < -1.6 \qquad (5\text{-}1)$$

where:
L4r is the paraxial radius of curvature of the image side surface of the fourth lens; and
L4f is the paraxial radius of curvature of the object side surface of the fourth lens.

16. An imaging apparatus equipped with the imaging lens of claim 1.

* * * * *